US005771127A

United States Patent [19]
Reed et al.

[11] Patent Number: 5,771,127
[45] Date of Patent: Jun. 23, 1998

[54] SAMPLED AMPLITUDE READ CHANNEL EMPLOYING INTERPOLATED TIMING RECOVERY AND A REMOD/DEMOD SEQUENCE DETECTOR

[75] Inventors: David E. Reed, Westminster; William R. Foland, Jr., Littleton; William G. Bliss, Thornton; Richard T. Behrens, Louisville; Lisa C. Sundell, Westminster, all of Colo.

[73] Assignee: Cirrus Logic, Inc., Fremont, Calif.

[21] Appl. No.: 681,678

[22] Filed: Jul. 29, 1996

[51] Int. Cl.$^6$ ............................................ G11B 5/09
[52] U.S. Cl. ................................. 360/51; 360/40
[58] Field of Search .............................. 360/51, 65, 53, 360/40; 371/43.8; 375/340, 345, 354, 376, 350, 329, 235; 358/425; 348/727, 811

[56] References Cited

U.S. PATENT DOCUMENTS

| | | | |
|---|---|---|---|
| 3,648,265 | 3/1972 | Kobayashi et al. | 360/40 |
| 5,521,945 | 5/1996 | Knudson . | |
| 5,696,639 | 12/1997 | Spurbeck et al. | 360/51 |

OTHER PUBLICATIONS

Takushi Nishiya, PERD: Partial Error Response Detection, *IEEE Inter Mag* '95, San Antonio, Texas, Apr. 1995.
Takushi Nishiya and Hideyuki Yamakawa, "PERD: Partial Error Response Detetion", *IEEE Transactions On Magnetics*, vol. 31, No. 6, Nov. 1995.
Roger Wood, "Turbo–PRML: A Compromise EPRML Detector" *IEEE Transactions On Magnetics*, vol. 29, No. 6, Nov. 1993.
Hideyuki Yamakawa, "SPERD: Simplified Partial Error Response Detection", *IEEE Inter Mag* '95, San Antonio, Texas, Apr. 1995.
U.S. application No. 08/546,162, Spurbeck et al., filed Oct. 20, 1995.

*Primary Examiner*—Nabil Hindi
*Assistant Examiner*—Patrick Wamsley
*Attorney, Agent, or Firm*—Howard H. Sheerin; Dan A. Shifrin

[57] ABSTRACT

In a computer disk storage system for recording binary data, a sampled amplitude read channel comprises a sampling device for asynchronously sampling pulses in an analog read signal from a read head positioned over a disk storage medium, interpolated timing recovery for generating synchronous sample values, and a sequence detector for detecting the binary data from the synchronous sample values. The sequence detector comprises a demodulator for detecting a preliminary binary sequence which may contain bit errors, a remodulator for remodulating to estimated sample values, a means for generating sample error values, an error pattern detector for detecting the bit errors, an error detection validator, and an error corrector for correcting the bit errors. The remodulator comprises a partial erasure circuit which compensates for the non-linear reduction in amplitude of a primary pulse caused by secondary pulses located near the primary pulse. The error pattern detector comprises a peak error pattern detector and, if an error pattern is detected, a means for disabling the error pattern detector until the detected error pattern has been fully processed. The error detection validator checks the validity of a detected error event and, if valid, enables operation of the error corrector.

28 Claims, 14 Drawing Sheets

NRZ

PR 4

EPR 4

SAMPLED AMPLITUDE READ CHANNEL EMPLOYING INTERPOLATED TIMING RECOVERY AND A REMOD/DEMOD SEQUENCE DETECTOR

FIELD OF INVENTION

The present invention relates to the control of storage systems for digital computers (such as magnetic and optical disk drives), particularly to a sampled amplitude read channel that employs asynchronous sampling of an analog read signal, interpolated timing recovery, and a remod/demod sequence detector.

CROSS REFERENCE TO RELATED APPLICATIONS AND PATENTS

This application is related to other co-pending U.S. patent applications, namely application Ser. No. 08/440,515 entitled "Sampled Amplitude Read Channel For Reading User Data and Embedded Servo Data From a Magnetic Medium," 08/341,251 entitled "Sampled Amplitude Read Channel Comprising Sample Estimation Equalization, Defect Scanning, Channel Quality, Digital Servo Demodulation, PID Filter for Timing Recovery, and DC Offset Control," 08/313,491 entitled "Improved Timing Recovery For Synchronous Partial Response Recording, "and 08/533,797 entitled "Improved Fault Tolerant Sync Mark Detector For Sampled Amplitude Magnetic Recording". This application is also related to several U.S. patents, namely U.S. Pat. No. 5,359,631 entitled "Timing Recovery Circuit for Synchronous Waveform Sampling, "5,291,499 entitled "Method and Apparatus for Reduced-Complexity Viterbi-Type Sequence Detectors, "5,297,184 entitled "Gain Control Circuit for Synchronous Waveform Sampling, "5,329,554 entitled "Digital Pulse Detector, "and 5,424,881 entitled "Synchronous Read Channel." All of the above-named patent applications and patents are assigned to the same entity, and all are incorporated herein by reference.

BACKGROUND OF THE INVENTION

Computer storage systems (such as optical, magnetic, and the like) record digital data onto the surface of a storage medium, which is typically in the form of a rotating magnetic or optical disk, by altering a surface characteristic of the disk. The digital data serves to modulate the operation of a write transducer (write head) which records binary sequences onto the disk in radially concentric or spiral tracks. In magnetic recording systems, for example, the digital data modulates the current in a write coil in order to record a series of magnetic flux transitions onto the surface of a magnetizable disk. And in optical recording systems, for example, the digital data may modulate the intensity of a laser beam in order to record a series of "pits" onto the surface of an optical disk. When reading this recorded data, a read transducer (read head), positioned in close proximity to the rotating disk, detects the alterations on the medium and generates a sequence of corresponding pulses in an analog read signal. These pulses are then detected and decoded by read channel circuitry in order to reproduce the digital sequence.

Detecting and decoding the pulses into a digital sequence can be performed by a simple peak detector in a conventional analog read channel or, as in more recent designs, by a discrete time sequence detector in a sampled amplitude read channel. Discrete time sequence detectors are preferred over simple analog pulse detectors because they compensate for intersymbol interference (ISI) and are less susceptible to channel noise. Consequently, discrete time sequence detectors increase the capacity and reliability of the storage system. There are several well known discrete time sequence detection methods including discrete time pulse detection (DPD), partial response (PR) with Viterbi detection, maximum likelihood sequence detection (MLSD), decision-feedback equalization (DFE), enhanced decision-feedback equalization (EDFE), and fixed-delay tree-search with decision-feedback (FDTS/DF).

In a conventional peak detection read channel, analog circuitry detects peaks in the continuous time analog read signal generated by the read head. The analog read signal is "segmented" into bit cell periods and interpreted during these segments of time. The presence of a peak during the bit cell period is detected as a "1" bit, whereas the absence of a peak is detected as a "0" bit. The most common errors in detection occur when the bit cells are not correctly aligned with the analog pulse data. Timing recovery, then, adjusts the bit cell periods so that the peaks occur in the center of the bit cells on average in order to minimize detection errors. Since timing information is derived only when peaks are detected, the input data stream is normally run length limited (RLL) to limit the number of consecutive "0" bits.

As the pulses are packed closer together on the data tracks in the effort to increase data density, detection errors can also occur due to intersymbol interference (ISI), a distortion in the read signal caused by closely spaced, overlapping pulses. This interference can cause a peak to shift out of its bit cell, or its magnitude to decrease, resulting in a detection error. This ISI effect is reduced by decreasing the data density or by employing an encoding scheme that ensures a minimum number of "0" bits occur between "1" bits. For example, a (d,k) run length limited (RLL) code constrains to d the minimum number of "0" bits between "1" bits, and to k the maximum number of consecutive "0" bits. A typical (1,7) RLL 2/3 rate code encodes 8 bit data words into 12 bit codewords to satisfy the (1,7) constraint.

Sampled amplitude detection, such as partial response (PR) with Viterbi detection, allows for increased data density by compensating for intersymbol interference and the effect of channel noise. Unlike conventional peak detection systems, sampled amplitude recording detects digital data by interpreting, at discrete time instances, the actual value of the pulse data. To this end, the read channel comprises a sampling device for sampling the analog read signal, and a timing recovery circuit for synchronizing the samples to the baud rate (code bit rate). Before sampling the pulses, a variable gain amplifier adjusts the read signal's amplitude to a nominal value, and a low pass analog filter filters the read signal to attenuate channel and aliasing noise. After sampling, a digital equalizer equalizes the sample values according to a desired partial response, and a discrete time sequence detector, such as a Viterbi detector, interprets the equalized sample values in context to determine a most likely sequence for the digital data (i.e., maximum likelihood sequence detection (MLSD)). MLSD takes into account the effect of ISI and channel noise in the detection algorithm, thereby decreasing the probability of a detection error. This increases the effective signal to noise ratio and, for a given (d,k) constraint, allows for significantly higher data density as compared to conventional analog peak detection read channels.

The application of sampled amplitude techniques to digital communication channels is well documented. See Y. Kabal and S. Pasupathy, "Partial Response Signaling", *IEEE Trans. Commun. Tech.*, ,Vol. COM-23, pp.921–934, September 1975; and Edward A. Lee and David G.

Messerschmitt, "Digital Communication", Kluwer Academic Publishers, Boston, 1990; and G. D. Forney, Jr., "The Viterbi Algorithm", *Proc. IEEE*, Vol. 61, pp. 268–278, March 1973.

Applying sampled amplitude techniques to magnetic storage systems is also well documented. See Roy D. Cideciyan, Francois Dolivo, Walter Hirt, and Wolfgang Schott, "A PRML System for Digital Magnetic Recording", *IEEE Journal on Selected Areas in Communications*, Vol. 10 No. 1, January 1992, pp.38–56; and Wood et al, "Viterbi Detection of Class IV Partial Response on a Magnetic Recording Channel, "*IEEE Trans. Commun.*, Vol. Com-34, No. 5, pp. 454–461, May 1986; and Coker Et al, "Implementation of PRML in a Rigid Disk Drive, "*IEEE Trans. on Magnetics*, Vol. 27, No. 6, November 1991; and Carley et al, "Adaptive Continous-Time Equalization Followed By FDTS/DF Sequence Detection", *Digest of The Magnetic Recording Conference*, Aug. 15–17, 1994, pp. C3; and Moon et al, "Constrained-Complexity Equalizer Design for Fixed Delay Tree Search with Decision Feedback", *IEEE Trans. on Magnetics*, Vol. 30, No. 5, September 1994; and Abbott et al, "Timing Recovery For Adaptive Decision Feedback Equalization of The Magnetic Storage Channel", *Globecom'90 IEEE Global Telecommunications Conference* 1990, San Diego, Calif., November 1990, pp.1794–1799; and Abbott et al, "Performance of Digital Magnetic Recording with Equalization and Offtrack Interference", *IEEE Transactions on Magnetics*, Vol. 27, No. 1, January 1991; and Cioffi et al, "Adaptive Equalization in Magnetic-Disk Storage Channels", *IEEE Communication Magazine*, February 1990; and Roger Wood, "Enhanced Decision Feedback Equalization", Intermag'90.

Similar to conventional peak detection systems, sampled amplitude detection requires timing recovery in order to correctly extract the digital sequence. Rather than process the continuous signal to align peaks to the center of bit cell periods as in peak detection systems, sampled amplitude systems synchronize the pulse samples to the baud rate. In conventional sampled amplitude read channels, timing recovery synchronizes a sampling clock by minimizing an error between the signal sample values and estimated sample values. A pulse detector or slicer determines the estimated sample values from the read signal samples. Even in the presence of ISI the sample values can be estimated and, together with the signal sample values, used to synchronize the sampling of the analog pulses in a decision-directed feedback system.

A phase-locked-loop (PLL) normally implements the timing recovery decision-directed feedback system. The PLL comprises a phase detector for generating a phase error estimate based on the difference between the estimated samples and the read signal samples. A PLL loop filter filters the phase error, and the filtered phase error operates to synchronize the channel samples to the baud rate.

Conventionally, the phase error adjusts the frequency of a sampling clock which is typically the output of a variable frequency oscillator (VFO). The output of the VFO controls a sampling device, such as an analog-to-digital (A/D) converter, to synchronize the sampling to the baud rate.

Partial response (PR) with Viterbi detection, as mentioned above, is a common method employed in sampled amplitude read channels for detecting the recorded digital data from the synchronous sample values. The most common Viterbi type sequence detection methods include: d=0 rate 8/9 PR4, a cost effective implementation requiring only two interleaved sliding threshold detectors; and d=1 rate 2/3 EPR4/EEPR4, an implementation which improves the bit error rate (BER) at higher densities but requires a more sophisticated add/compare/select (ASC) type of sequence detector.

The d=1 constraint in the EEPR4 read channels increases the minimum distance of the corresponding trellis code (and thus decreases the BER), and it reduces the complexity and cost of the sequence detector by reducing the number of states and allows further simplification by exploiting symmetry in the trellis model. However, there are drawbacks associated with a d=1 system.

Namely, in d=1 read channels, there is a decrease in user data rate due to the decrease in coding efficiency (rate 2/3 for d=1 as compared to rate 8/9 for d=0). Thus, in order to achieve higher user data rates the channel data rate (code bit rate) must be increased using faster, more complex timing recovery and A/D circuitry (i.e., a higher frequency timing recovery VCO and A/D converter). Additionally, as mentioned above, a d=1 EPR4/EEPR4 sequence detector is more expensive to implement due to the increased complexity in the trellis model.

There is, therefore, a need for a sampled amplitude read channel for use in computer storage systems that can operate at high user data rates and densities without increasing the cost and complexity of the analog-to-digital converter, timing recovery VCO or sequence detector.

SUMMARY OF THE INVENTION

In a computer disk storage system for recording binary data, a sampled amplitude read channel is disclosed which comprises a sampling device for asynchronously sampling pulses in an analog read signal from a read head positioned over a disk storage medium, interpolated timing recovery for generating synchronous sample values, and a sequence detector for detecting the binary data from the synchronous sample values. The sequence detector comprises a demodulator for detecting a preliminary binary sequence which may contain bit errors, a remodulator for remodulating to estimated sample values, a means for generating sample error values, an error pattern detector for detecting the bit errors, an error detection validator, and an error corrector for correcting the bit errors. The remodulator comprises a partial erasure circuit which compensates for the non-linear reduction in amplitude of a primary pulse caused by secondary pulses located near the primary pulse. The error pattern detector comprises a peak error pattern detector and, if an error pattern is detected, a means for disabling the error pattern detector until the detected error pattern has been fully processed. The error detection validator checks the validity of a detected error event and, if valid, enables operation of the error corrector.

The demodulator operates according to a d=0 constraint, thereby achieving faster user data rates while avoiding the increased-cost and complexity associated with a d=1 read channel. Further, the demodulator can be implemented as a simple interleaved PR4 Viterbi detector comprising two sliding threshold detectors. The error pattern detector and error corrector operate in a higher partial response domain (such as EPR4) which significantly improves the performance of the sequence detector without increasing the cost and complexity.

BRIEF DESCRIPTION OF THE DRAWINGS

The above and other aspects and advantages of the present invention will be better understood by reading the following detailed description of the invention in conjunction with the drawings, wherein.

DETAILED DESCRIPTION OF THE PREFERRED EMBODIMENT

Sampled Amplitude Read Channel

Figure 1:
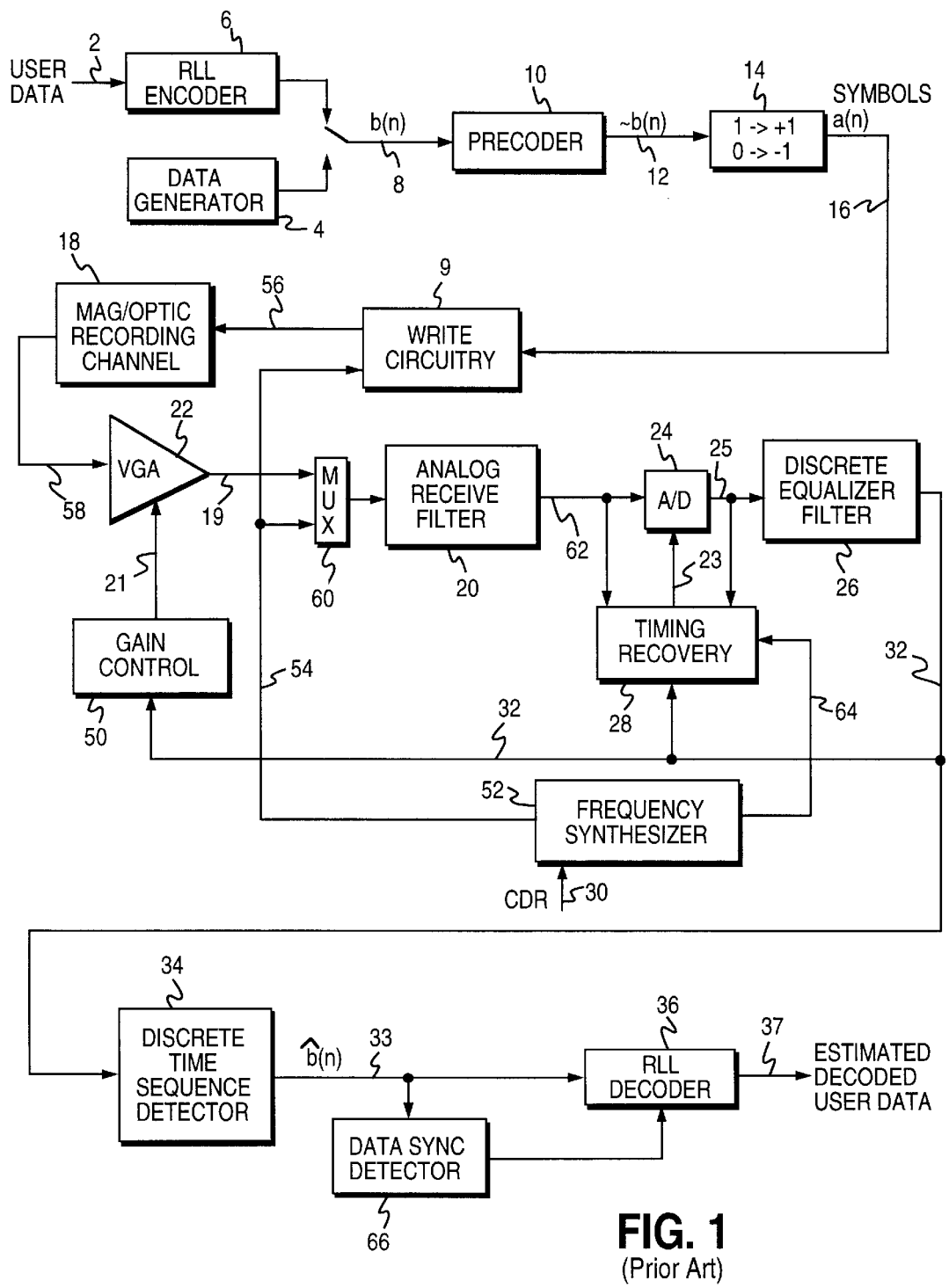
FIG. 1 is a block diagram of a conventional sampled amplitude read channel wherein timing recovery synchronizes the sampling of the analog read signal to the baud rate.

Referring now to FIG. 1, shown is a detailed block diagram of a conventional sampled amplitude read channel. During a write operation, either user data 2 or preamble data from a data generator 4 (for example 2T preamble data) is written onto the media. An RLL encoder 6 encodes the user data 2 into a binary sequence b(n) 8 according to an RLL constraint. A precoder 10 precodes the binary sequence b(n) 8 in order to compensate for the transfer function of the recording channel 18 and equalizer filters to form a precoded sequence ~b(n) 12. The precoded sequence ~b(n) 12 is converted into symbols a(n) 16 by translating 14 ~b(N)=0 into a(N)=−1, and ~b(N)=1 into a(N)=+1. Write circuitry 9, responsive to the symbols a(n) 16, modulates the current in the recording head coil at the baud rate 1/T to record the binary sequence onto the media. A frequency synthesizer 52 provides a baud rate write clock 54 to the write circuitry 9 and is adjusted by a channel data rate signal (CDR) 30 according to the zone the recording head is over.

When reading the recorded binary sequence from the media, timing recovery 28 first locks to the write frequency by selecting, as the input to the read channel, the write clock 54 through a multiplexer 60. Once locked to the write frequency, the multiplexer 60 selects the signal 19 from the read head as the input to the read channel in order to acquire an acquisition preamble recorded on the disk prior to the recorded user data. A variable gain amplifier 22 adjusts the amplitude of the analog read signal 58, and an analog filter 20 provides initial equalization toward the desired response as well as attenuating aliasing noise. A sampling device 24 samples the analog read signal 62 from the analog filter 20, and a discrete time equalizer filter 26 provides further equalization of the sample values 25 toward the desired response. In partial response recording, for example, the desired response is often selected from Table 1.

After equalization, the equalized sample values 32 are applied to a decision directed gain control 50 and timing recovery 28 circuit for adjusting the amplitude of the read signal 58 and the frequency and phase of the sampling device 24, respectively. Timing recovery adjusts the frequency of sampling device 24 over line 23 in order to synchronize the equalized samples 32 to the baud rate. Frequency synthesizer 52 provides a course center frequency setting to the timing recovery circuit 28 over line 64 in order to center the timing recovery frequency over temperature, voltage, and process variations. The channel data rate (CDR) 30 signal adjusts a frequency range of the synthesizer 52 according to the data rate for the current zone. Gain control 50 adjusts the gain of variable gain amplifier 22 over line 21 in order to match the magnitude of the channel's frequency response to the desired partial response.

The equalized samples 32 are also sent to a discrete time sequence detector 34, such as a maximum likelihood (ML) Viterbi sequence detector, which detects an estimated binary sequence ^b(n) 33 from the sample values. An RLL decoder 36 decodes the estimated binary sequence ^b(n) 33 from the sequence detector 34 into estimated user data 37. A data sync detector 66 detects the sync mark 70 (shown in FIG. 2B) in the data sector 15 in order to frame operation of the RLL decoder 36. In the absence of errors, the estimated binary sequence ^b(n) 33 matches the recorded binary sequence b(n) 8, and the decoded user data 37 matches the recorded user data 2.

Data Format

Figure 2A:
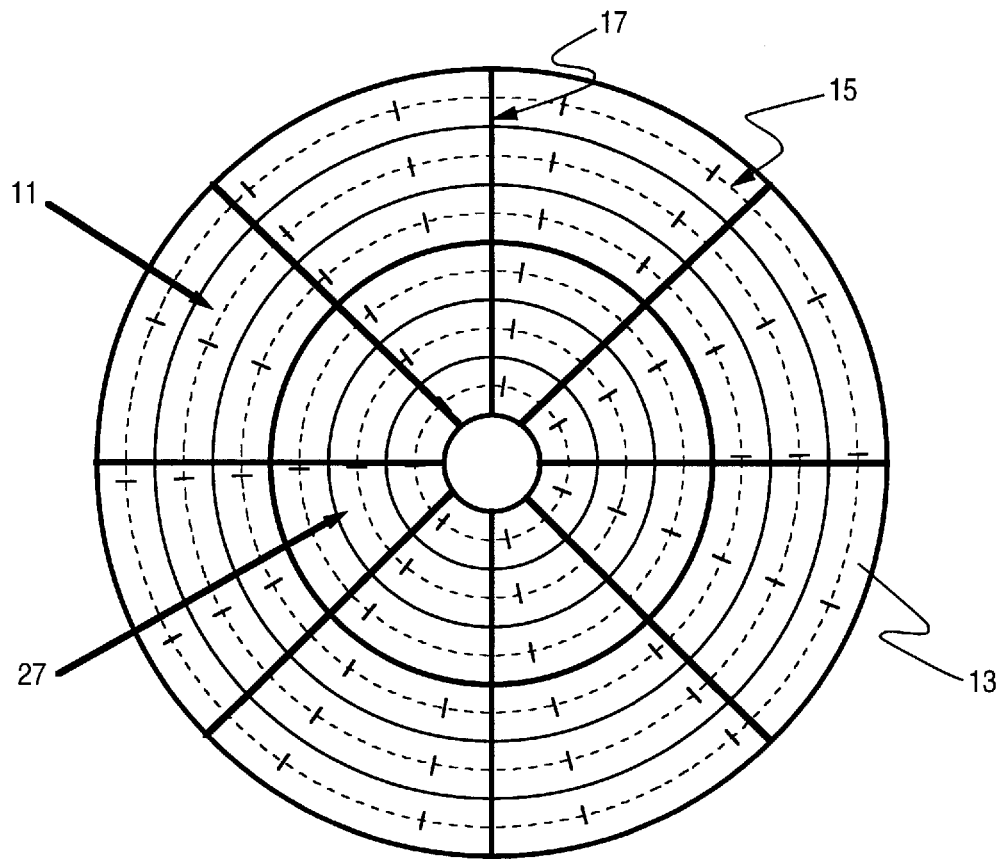
FIG. 2A shows an exemplary data format of a magnetic disk having a plurality of concentric tracks comprised of a plurality of user data sectors and embedded servo data sectors.

FIG. 2A shows an exemplary data format of a magnetic media comprising a series of concentric data tracks 13 wherein each data track 13 comprises a plurality of sectors 15 with embedded servo wedges 17. A servo controller (not shown) processes the servo data in the servo wedges 17 and, in response thereto, positions the read/write head over a desired track. Additionally, the servo controller processes servo bursts within the servo wedges 17 to keep the head aligned over a centerline of the desired track while writing and reading data. The servo wedges 17 may be detected by a simple discrete time pulse detector or by the discrete time sequence detector 34. If the sequence detector 34 detects the servo data, then the format of the servo wedges 17 includes a preamble and a sync mark, similar to the user data sectors 15.

Figure 2B:
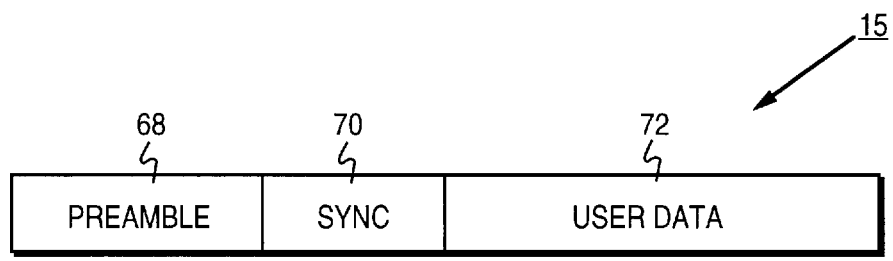
FIG. 2B shows an exemplary format of a user data sector.

FIG. 2B shows the format of a user data sector 15 comprising an acquisition preamble 68, a sync mark 70, and user data 72. Timing recovery uses the acquisition preamble 68 to acquire the correct sampling frequency and phase before reading the user data 72, and the sync mark 70 demarks the beginning of the user data 72.

To increase the overall storage density, the disk is partitioned into an outer zone 11 comprising fourteen data sectors per track, and an inner zone 27 comprising seven data sectors per track. In practice, the disk is actually partitioned into several zones with a different number of sectors in each zone, and the data recorded and detected at a different data rate in each zone.

Improved Sampled Amplitude Read Channel

Figure 3:
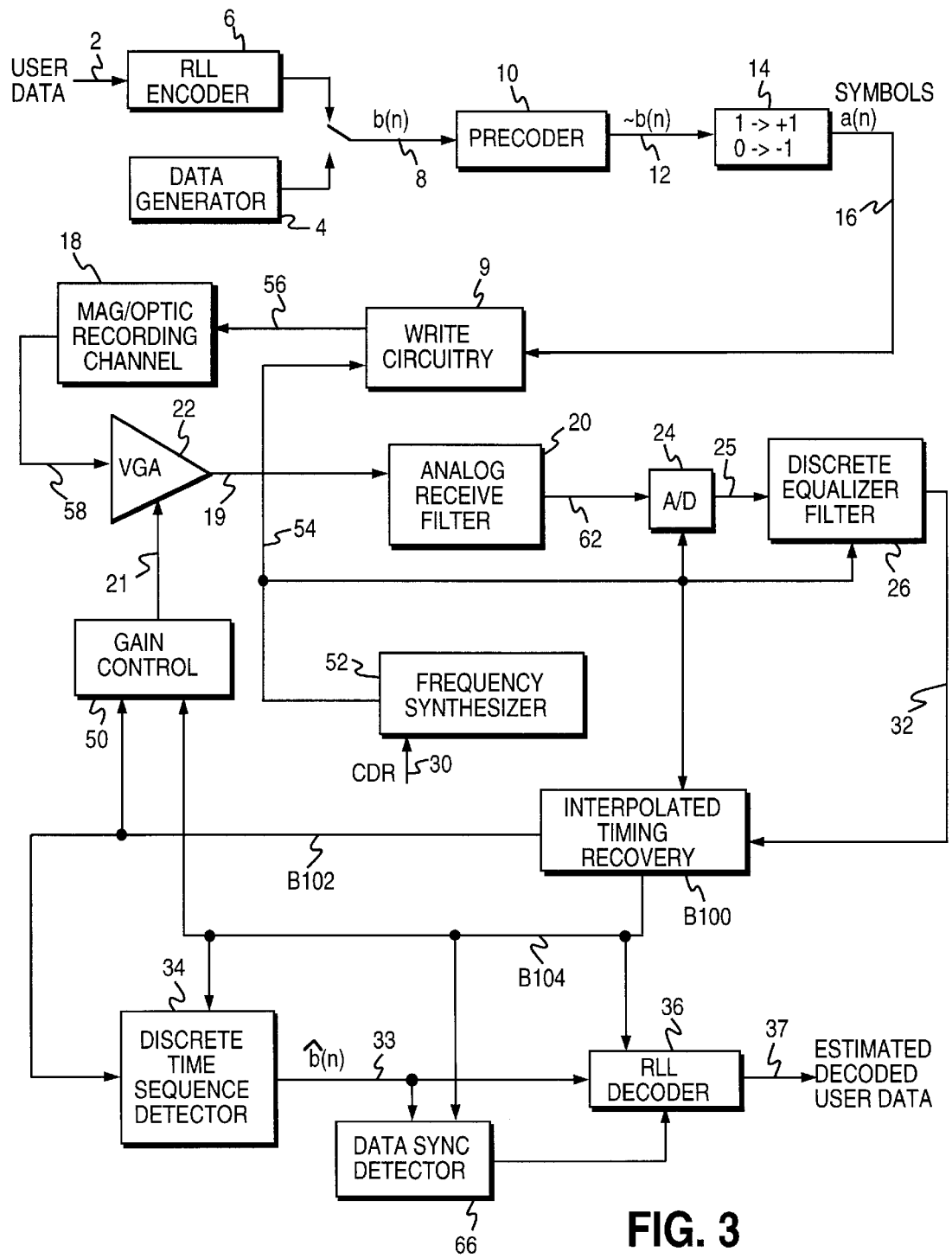
FIG. 3 is a block diagram of the improved sampled amplitude read channel of the present invention comprising interpolated timing recovery for generating interpolated sample values and a synchronous data clock for clocking operation of a discrete time sequence detector.

FIG. 3 shows the improved sampled amplitude read channel of the present invention wherein the conventional sampled timing recovery 28 of FIG. 1 has been replaced by interpolated timing recovery B100. In addition, the write frequency synthesizer 52 generates a baud rate write clock 54 applied to the write circuitry 9 during a write operation or an asynchronous read clock 54 for clocking the sampling device 24, the discrete time equalizer filter 26, and the interpolated timing recovery B100 at a frequency relative to the current zone (CDR 30) during a read operation. In an alternative embodiment, a first frequency synthesizer generates the write clock, and a second frequency synthesizer generates the read clock.

The interpolated timing recovery B100 interpolates the equalized sample values 32 to generate interpolated sample values B102 substantially synchronized to the data rate of the current zone. A discrete time sequence detector 34 detects an estimated binary sequence 33 representing the user data from the interpolated sample values B102 (synchronized sample values). Further, the interpolated timing recovery B100 circuit generates a frequency synchronous data clock B104 for clocking operation of the gain control 50, discrete time sequence detector 34, sync mark detector 66 and RLL decoder 36.

Conventional Timing Recovery

Figure 4A:
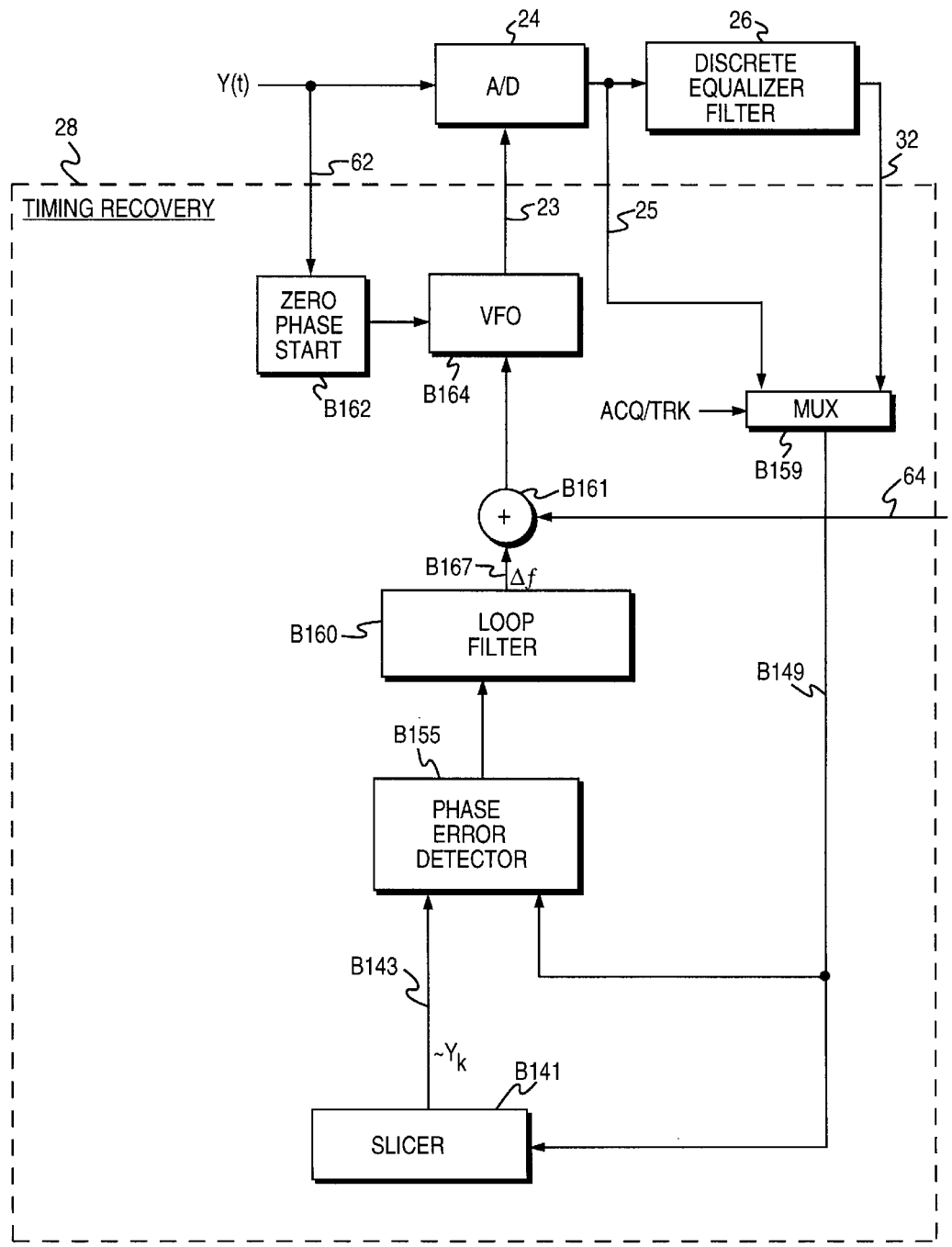
FIG. 4A is a detailed block diagram of the prior art sampling timing recovery comprising a synchronized sampling VFO.

An overview of the conventional sampling timing recovery 28 of FIG. 1. is shown in FIG. 4A. The output 23 of a variable frequency oscillator (VFO) B164 controls the sampling clock of a sampling device 24 which is typically an analog-to-digital converter (A/D) in digital read channels. A multiplexer B159 selects the unequalized sample values 25 during acquisition and the equalized sample values 32 during tracking, thereby removing the discrete equalizer filter 26 from the timing loop during acquisition in order to avoid its associated latency. A phase error detector B155 generates a phase error in response to the sample values received over line B149 and estimated sample values $\sim Y_k$ from a sample value estimator B141, such as a slicer in a d=0PR4 read channel, over line B143. A loop filter B160 filters the phase error to generate a frequency offset $\Delta f$ B167 that settles to a value proportional to a frequency difference between the sampling clock 23 and the baud rate. The frequency offset $\Delta f$ B167, together with the center frequency control signal 64 from the-frequency synthesizer 52, adjust the sampling clock 23 at the output of the VFO B164 in order to synchronize the sampling to the baud rate.

A zero phase start B162 circuit suspends operation of the VFO B164 at the beginning of acquisition in order to minimize the initial phase error between the sampling clock 23 and the read signal 62. This is achieved by disabling the VFO B164, detecting a zero crossing in the analog read signal 62, and re-enabling the VFO 164 after a predetermined delay between the detected zero crossing and the first baud rate sample.,

Interpolated Timing Recovery

Figure 4B:
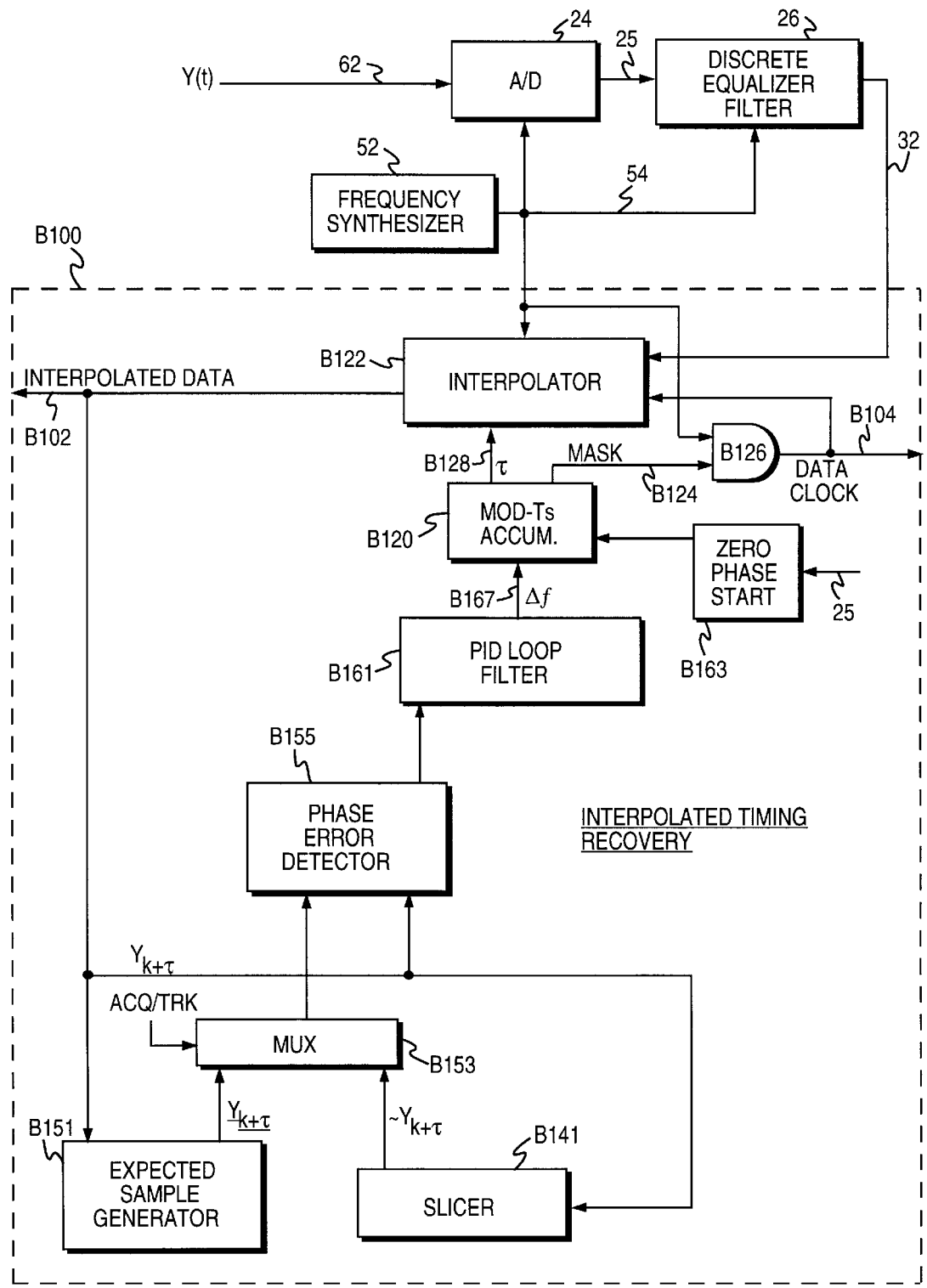
FIG. 4B is a detailed block diagram of the interpolating timing recovery of the present invention comprising asynchronous sampling and an interpolator for generating interpolated sample values substantially synchronized to the baud rate.

The interpolated timing recovery B100 of the present invention is shown in FIG. 4B. The VFO B164 in the conventional timing recovery of FIG. 4A is replaced with a modulo-Ts accumulator B120 and an interpolator B122. In addition, an expected sample value generator B151, responsive to interpolated sample values B102, generates expected samples $Y_{k+\tau}$ used by the phase error detector B155 to compute the phase error during acquisition. A multiplexer B153 selects the estimated sample values $\sim Y_{k+\tau}$ from the slicer B141 for use by the phase error detector B155 during tracking. The data clock B104 is generated at the output of an AND gate B126 in response to the sampling clock 54 and a mask signal B124 from the modulo-Ts accumulator B120 as discussed in further detail below. The phase error detector B155 and the slicer B141 process interpolated sample values B102 at the output of the interpolator B122 rather than the channel sample values 32 at the output of the discrete equalizer filter 26 as in FIG. 4A. A PID loop filter B161 controls the closed loop frequency response similar to the loop filter B160 of FIG. 4A.

In the interpolated timing recovery of the present invention, locking a VFO to a reference frequency before acquiring the preamble is no longer necessary; multiplexing 60 the write clock 54 into the analog receive filter 20 (as in FIG. 1) is not necessary. Further, the sampling device 24 and the discrete equalizer filter 26, together with their associated delays, have been removed from the timing recovery loop; it is not necessary to multiplex B159 around the equalizer filter 26 between acquisition and tracking. However, it is still necessary to acquire a preamble 68 before tracking the user data 72. To this end, a zero phase start circuit B163 minimizes the initial phase error between the interpolated sample values and the baud rate at the beginning of acquisition similar to the zero phase start circuit B162 of FIG. 4A. However, rather than suspend operation of a sampling VFO B164, the zero phase start circuit B163 for interpolated timing recovery computes an initial phase error T from the A/D 24 sample values 25 and loads this initial phase error into the modulo-Ts accumulator B120.

A detailed description of the modulo-Ts accumulator B120, data clock B104, and interpolator B122 is provided in the following discussion.

Interpolator

Figure 5:
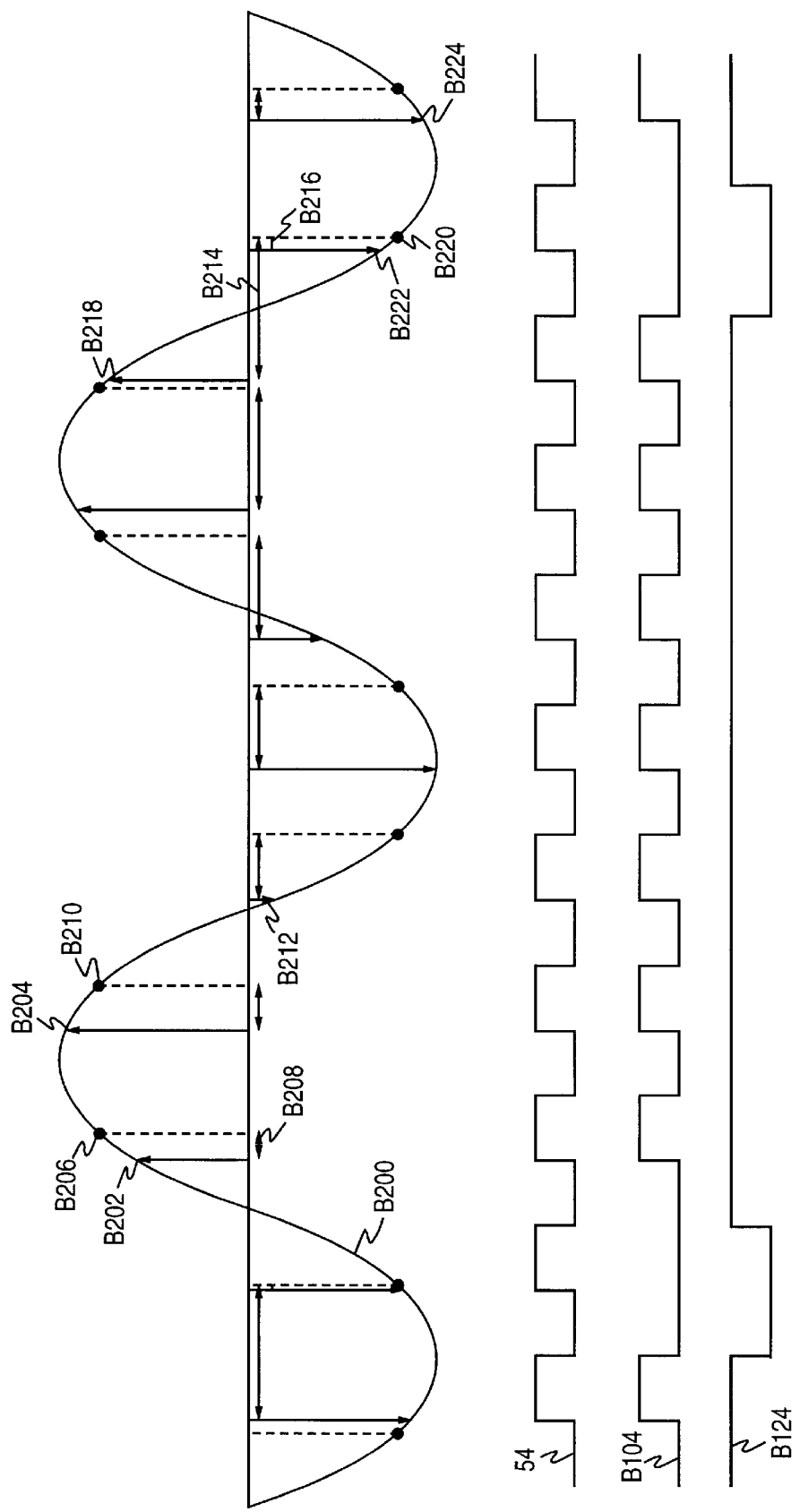
FIG. 5 illustrates the channel samples in relation to the interpolated baud rate samples when reading the acquisition preamble.

The interpolator B122 of FIG. 4B is understood with reference to FIG. 5 which shows a sampled 2T acquisition preamble signal B200. The target synchronous sample values B102 are shown as black circles and the asynchronous channel sample values 32 as vertical arrows. Beneath the sampled preamble signal is a timing diagram depicting the corresponding timing signals for the sampling clock 54, the data clock B104 and the mask signal B124. As can be seen in FIG. 5, the preamble signal B200 is sampled slightly faster than the baud rate (the rate of the target values).

The function of the interpolator is to estimate the target sample value by interpolating the channel sample values. For illustrative purposes, consider a simple estimation algorithm, linear interpolation:

$$Y(N-1)=x(N-1)+\tau \cdot (x(N)-x(N-1)) \tag{1}$$

where x(N−1) and x(N) are the channel samples surrounding the target sample; and τ is an interpolation interval proportional to a time difference between the channel sample value x(N−1) and the target sample value. The interpolation interval τ is generated at the output of modulo-Ts accumulator B120 which accumulates the frequency offset signal Δf B167 at the output of the PID loop filter B161:

$$\tau = (\Sigma \Delta f) \text{ MOD TS} \quad (2)$$

where Ts is the sampling period of the sampling clock 54. Since the sampling clock 54 samples the analog read signal 62 slightly faster than the baud rate, it is necessary to mask the data clock every time the accumulated frequency offset Δf, integer divided by Ts, increments by 1. Operation of the data clock B104 and the mask signal B124 generated by the modulo-Ts accumulator B120 is understood with reference to the timing diagram of FIG. 5.

Assuming the interpolator implements the simple linear equation (1) above, then channel sample values B202 and B204 are used to generate the interpolated sample value corresponding to target sample value B206. The interpolation interval τ B208 is generated according to equation (2) above. The next interpolated sample value corresponding to the next target value B210 is computed from channel sample values B204 and B212. This process continues until the interpolation interval τ B214 would be greater than Ts except that it "wraps" around and is actually τ B216 (i.e., the accumulated frequency offset Δf, integer divided by Ts, increments by 1 causing the mask signal B124 to activate). At this point, the data clock B104 is masked by mask signal B124 so that the interpolated sample value corresponding to the target sample value B220 is computed from channel sample values B222 and B224 rather than channel sample values B218 and B222.

The simple linear interpolation of equation (1) will only work if the analog read signal is sampled at a much higher frequency than the baud rate. This is not desirable since operating the channel at higher frequencies increases its complexity and cost. Therefore, in the preferred embodiment the interpolator B122 is implemented as a filter responsive to more than two channel samples to compute the interpolated sample value.

The ideal discrete time phase interpolation filter has a flat magnitude response and a constant group delay of τ:

$$C_\tau(e^{j\omega}) = e^{j\omega\tau} \quad (3)$$

which has an ideal impulse response:

$$\text{sinc } (\pi \cdot (n - \tau/T_s)). \quad (4)$$

Unfortunately, the above non-causal infinite impulse response (4) cannot be realized. Therefore, the impulse response of the interpolation filter is designed to be a best fit approximation of the ideal impulse response (4). This can be accomplished by minimizing a mean squared error between the frequency response of the actual interpolation filter and the frequency response of the ideal interpolation filter (3). This approximation can be improved by taking into account the spectrum of the input signal, that is, by minimizing the mean squared error between the input spectrum multiplied by the actual interpolation spectrum and the input spectrum multiplied by the ideal interpolation spectrum:

$$\overline{C}_\tau(e^{j\omega})X(e^{j\omega}) - C_\tau(e^{j\omega})X(e^{j\omega}) \quad (5)$$

where $\overline{C}_\tau(e^{j\omega})$ is the spectrum of the actual interpolation filter; and $X(e^{j\omega})$ is the spectrum of the input signal. From equation (5), the mean squared error is represented by:

$$E_\tau^2 = \frac{1}{2\pi} \int_{-\pi}^{\pi} |\overline{C}_\tau(e^{j\omega}) - e^{j\omega\tau}|^2 |X(e^{j\omega})|^2 d\omega \quad (6)$$

where $X(e^{j\omega})$ is the spectrum of the read channel (e.g., PR4, EPR4, EEPR4 of Table 1 or some other partial response spectrum).

In practice, the above mean squared error equation (6) is modified by specifying that the spectrum of the input signal is bandlimited to some predetermined constant $0 \leq \omega \leq \alpha\pi$ as where 0<α<1; that is:

$$|X(e^{j\omega})| = 0, \text{ for } |\omega| \geq \alpha\pi.$$

Then equation (6) can be expressed as:

$$E_{\tau,\alpha}^2 = \frac{1}{2\pi} \int_{-\alpha\pi}^{\alpha\pi} |\overline{C}_\tau(e^{j\omega}) - e^{j\omega\tau}|^2 |X(e^{j\omega})|^2 d\omega. \quad (7)$$

The solution to the minimization problem of equation (7) involves expressing the actual interpolation filter in terms of its coefficients and then solving for the coefficients that minimize the error in a classical mean-square sense.

The actual interpolation filter can be expressed as the FIR polynomial:

$$\overline{C}_\tau(e^{j\omega}) = \sum_{n=-R}^{n=R-1} C_\tau(n) e^{-j\omega n} \quad (8)$$

where 2R is the number of taps in each interpolation filter and the sample period Ts has been normalized to 1. A mathematical derivation for an interpolation filter having an even number of coefficients is provided below. It is within the ability of those skilled in the art to modify the mathematics to derive an interpolation filter having an odd number of coefficients.

Substituting equation (8) into equation (7) leads to the desired expression in terms of the coefficients $C_\tau(n)$:

$$E_{\tau,\alpha}^2 = \frac{1}{2\pi} \int_{-\alpha\pi}^{\alpha\pi} \left| \sum_{n=-R}^{n=R-1} C_\tau(n) e^{-j\omega n} - e^{j\omega\tau} \right|^2 |X(e^{j\omega})|^2 d\omega. \quad (9)$$

The next step is to take the derivatives of equation (9) with respect to the coefficients $C_\tau(n)$ and set them to zero:

$$\frac{\partial E_{\tau,\alpha}^2}{\partial C_\tau(n_o)} = 0 \text{ for } n_o = -R, \ldots, 0, 1, \ldots, R-1. \quad (10)$$

After careful manipulation, equation (10) leads to:

$$\int_{-\alpha\pi}^{\alpha\pi} \left[ \left( \sum_{n=-R}^{n=R-1} C_\tau(n) \cos(\omega(n_o - n)) \right) - \cos(\omega(n_o + \tau)) \right] |X(e^{j\omega})|^2 d\omega = 0 \quad (11)$$

for $n_o = -R, \ldots, 0, 1, \ldots, R-1$.

Defining φ(r) as:

$$\phi(r) = \int_{-\alpha\pi}^{\alpha\pi} |X(e^{j\omega})|^2 \cos(\omega r) d\omega \quad (12)$$

and substituting equation (12) into equation (11) gives:

$$\sum_{n=-R}^{n=R-1} C_\tau(n)\phi(n-n_o) = \phi(n_o+\tau) \quad (13)$$

for $n_o = -R, \ldots, 0, 1, \ldots, R-1$.

Equation (13) defines a set of 2R linear equations in terms of the coefficients $C_{96}(n)$. Equation (13) can be expressed more compactly in matrix form:

$$\Phi_T C_\tau = \Phi_\tau$$

where $C_\tau$ is a column vector of the form:

$$C_\tau = [C_\tau(-R), \ldots, C_\tau(0), \ldots, C_\tau(R-1)]^t$$

$\Phi_T$ is a Toeplitz matrix of the form:

$$\Phi_T = \begin{bmatrix} \phi(0) & \phi(1) & \ldots & \phi(2R-1) \\ \phi(1) & \phi(0) & & \\ \cdot & & & \cdot \\ \cdot & & & \cdot \\ \cdot & & & \cdot \\ \phi(2R-1) & & \ldots & \phi(0) \end{bmatrix}$$

and $\Phi_\tau$ is a column vector of the form:

$$\Phi_\tau = [\phi(-R+\tau), \ldots, \phi(\tau), \phi(1+\tau), \ldots, \phi(R-1+\tau)]^t. \quad (14)$$

The solution to equation (14) is:

$$C_\tau = \Phi_T^{-1} \Phi_\tau \quad (15)$$

where $\Phi_T^{-1}$ is an inverse matrix that can be solved using well known methods.

Figure 6:
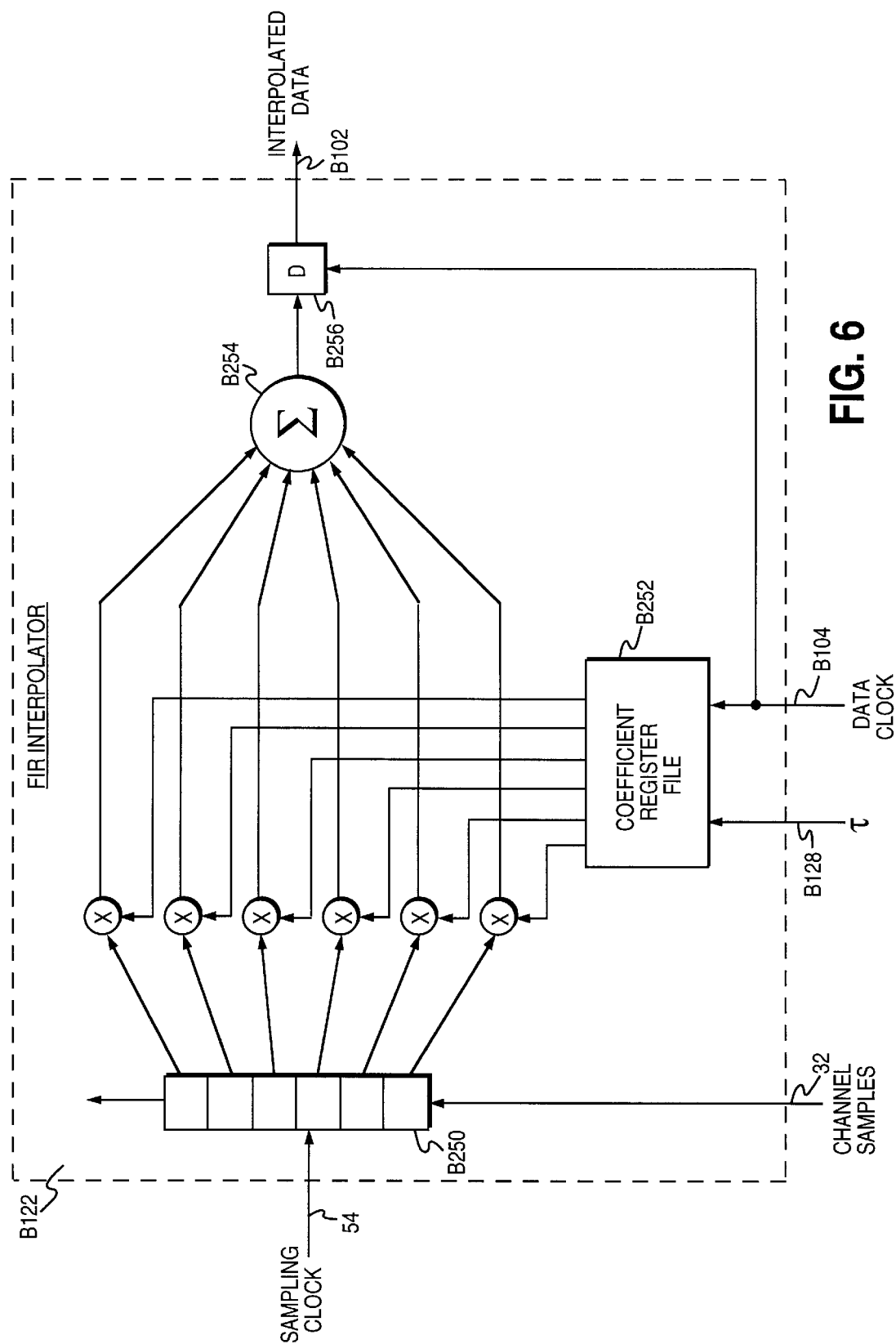
FIG. 6 shows an FIR filter implementation for the timing recovery interpolator.

Table B2 shows example coefficients $C_\tau(n)$ calculated from equation (15) with 2R=6, $\alpha$=0.8 and $X(e^{j\omega})$=PR4. The implementation of the six tap FIR filter is shown in FIG. 6. A shift register B250 receives the channel samples 32 at the sampling clock rate 54. The filter coefficients $C_\tau(n)$ are stored in a coefficient register file B252 and applied to corresponding multipliers according to the current value of $\tau$ B128. The coefficients are multiplied by the channel samples 32 stored in the shift register B250. The resulting products are summed B254 and the sum stored in a delay register B256. The coefficient register file B252 and the delay register B256 are clocked by the data clock B104 to implement the masking function described above.

In an alternative embodiment not shown, a plurality of static FIR filters, having coefficients that correspond to the different values of $\tau$, filter the sample values in the shift register B250. Each filter outputs an interpolation value, and the current value of the interpolation interval $\tau$ B128 selects the output of the corresponding filter as the output B102 of the interpolator B122. Since the coefficients of one filter are not constantly updated as in FIG. 6, this multiple filter embodiment increases the speed of the interpolator B122 and the overall throughput of the read channel.

Cost Reduced Interpolator

Rather than store all of the coefficients of the interpolation filters in memory, in a more efficient, cost reduced implementation the coefficient register file B252 of FIG. 6 computes the filter coefficients $C_\tau(n)$ in real time as a function of $\tau$. For example, the filter coefficients $C_\tau(n)$ can be computed in real time according to a predetermined polynomial in c (see, for example, U.S. Pat. No. 4,866,647 issued to Farrow entitled, "A Continuously Variable Digital Delay Circuit," the disclosure of which is hereby incorporated by reference). An alternative, preferred embodiment for computing the filter coefficients in real time estimates the filter coefficients according to a reduced rank matrix representation of the coefficients.

The bank of filter coefficients stored in the coefficient register file B252 can be represented as an MxN matrix $A_{MxN}$, where N is the depth of the interpolation filter (i.e., the number of coefficients $C_\tau(n)$ in the impulse response computed according to equation (15)) and M is the number of interpolation intervals (i.e., the number of $\tau$ intervals). Rather than store the entire $A_{MxN}$ matrix in memory, a more efficient, cost reduced implementation is attained through factorization and singular value decomposition (SVD) of the $A_{MxN}$ matrix.

Consider that the $A_{MxN}$ matrix can be factored into an $F_{MxN}$ and $G_{NxN}$ matrix, $$A_{MxN} = F_{MxN} \cdot G_{NxN}.$$

Then a reduced rank approximation of the $A_{MxN}$ matrix can be formed by reducing the size of the $F_{MxN}$ and $G_{NxN}$ matrices by replacing N with L where L<N and, preferably, L<<N. Stated differently, find the $F_{MxL}$ and $G_{LxN}$ matrices whose product best approximates the $A_{MxN}$ matrix, $$A_{MxN} \approx F_{MxL} \cdot G_{LxN}.$$

Figure 7:
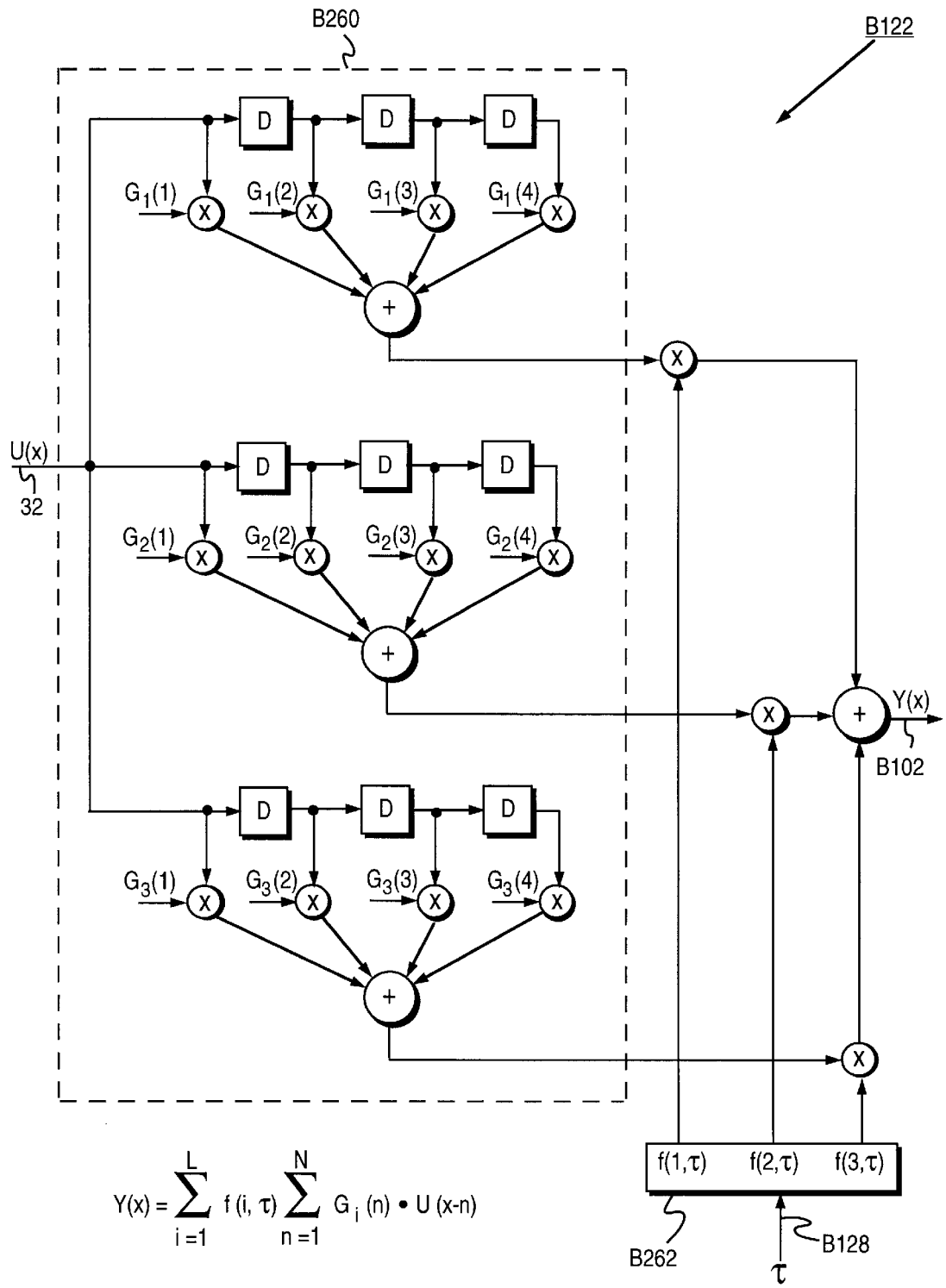
FIG. 7 depicts a alternative implementation for the timing recovery interpolator.

The convolution process of the interpolation filter can then be carried out, as shown in FIG. 7, by implementing the $G_{LxN}$ matrix as a bank of FIR filters B260 connected to receive the channel sample values 32, and the $F_{MxL}$ matrix implemented as a lookup table B262 indexed by $\tau$ B128 (as will become more apparent in the following discussion). Those skilled in the art will recognize that, in an alternative embodiment, the $A_{MxN}$ matrix can be factored into more than two matrices (i.e., A≈FGH ...).

The preferred method for finding the $F_{MxL}$ and $G_{LxN}$ matrices is to minimize the following sum of squared errors:

$$\sum_{j=1}^{M} \sum_{n=1}^{N} (A_{jn} - (F_{MxL} \cdot G_{LxN})_{jn})^2 \quad (16)$$

The solution to equation (16) can be derived through a singular value decomposition of the $A_{MxN}$ matrix, comprising the steps of:

1. performing an SVD on the $A_{MxN}$ matrix which gives the following unique factorization (assuming M≧N):

$$A_{MxN} = U_{MxN} \cdot D_{NxN} \cdot V_{NxN}$$

where:

$U_{MxN}$ is a MxN unitary matrix;
$D_{NxN}$ is a NxN diagonal matrix $\{\sigma_1, \sigma_2, \ldots, \sigma_N\}$ where $\sigma_1$ are the
singular values of $A_{MxN}$, and $\sigma_1 \geq \sigma_2 \ldots \geq \sigma_N \geq 0$; and
$V_{NxN}$ is a NxN unitary matrix;

2. selecting a predetermined L number of the largest singular values $\sigma$ to generate a reduced size diagonal matrix $D_{LxN}$:

$$D_{L \times L} = \text{Diag}\{\sigma_1, \sigma_2, \ldots, \sigma_L\} = \begin{bmatrix} \sigma_1 & 0 & \ldots & 0 \\ 0 & \sigma_2 & 0 \ldots & \cdot \\ \cdot & \ldots & \cdot & 0 \\ 0 & \ldots & 0 & \sigma_L \end{bmatrix}$$

3. extracting the first L columns from the $U_{M \times N}$ matrix to form a reduced $U_{M \times L}$ matrix:

$$U_{M \times L} = \begin{bmatrix} U_{1,1} & \ldots & U_{1,L} & \ldots & U_{1,N} \\ \cdot & \ldots & \ldots & \ldots & \cdot \\ \cdot & \ldots & \ldots & \ldots & \cdot \\ \cdot & \ldots & \ldots & \ldots & \cdot \\ U_{M,1} & \ldots & U_{M,L} & \ldots & U_{M,N} \end{bmatrix}$$

4. extracting the first L rows from the $V_{N \times N}$ matrix to form a reduced $V_{L \times N}$ matrix:

$$V_{L \times N} = \begin{bmatrix} V_{1,1} & \ldots & V_{1,N} \\ \cdot & \ldots & \cdot \\ V_{L,1} & \ldots & V_{L,N} \\ \cdot & \ldots & \cdot \\ V_{N,1} & \ldots & V_{N,N} \end{bmatrix}$$

5. defining the $F_{M \times L}$ and $G_{L \times N}$ matrices such that:

$$F_{M \times L} \cdot G_{L \times N} = U_{M \times L} \cdot D_{L \times N} \cdot V_{L \times N} \approx A_{M \times N}$$

(for example, let $F_{M \times L} = U_{M \times L} \cdot D_{L \times N}$ and $G_{L \times N} = V_{L \times N}$).

In the above cost reduced polynomial and reduced rank matrix embodiments, the interpolation filter coefficients $C_\tau(n)$ are computed in real time as a function of $\tau$; that is, the filter's impulse response h(n) is approximated according to:

$$h(n, \tau) = c_\tau(n) = \sum_{i=1}^{L} G_i(n) \cdot f(i, \tau) \quad (17)$$

where $f(i,\tau)$ is a predetermined function in $\tau$ (e.g., polynomial in $\tau$ or $\tau$ indexes the above $F_{M \times L}$ matrix); L is a degree which determines the accuracy of the approximation (e.g., the order of the polynomial or the column size of the above $F_{M \times L}$ matrix); and $G_i(n)$ is a predetermined matrix (e.g., the coefficients of the polynomial or the above $G_{L \times N}$ matrix). As L increases, the approximated filter coefficients $C_\tau(n)$ of equation (17) tend toward the ideal coefficients derived from equation (15). It follows from equation (17) that the output of the interpolation filter Y(x) can be represented as:

$$Y(x) = \sum_{n=1}^{N} U(x-n) \sum_{i=1}^{L} G_i(n) \cdot f(i, \tau) \quad (18)$$

where U(x) are the channel sample values 32 and N is the number of interpolation filter coefficients $C_\tau(n)$.

Referring again to FIG. 6, the coefficient register file can compute the interpolation filter coefficients $C_\tau(n)$ according to equation (17) and then convolve the coefficients $C_\tau(n)$ with the channel samples U(x) 32 to generate the interpolated sample values B102 synchronized to the baud rate. However, a more efficient implementation of the interpolation filter can be realized by rearranging equation (18):

$$Y(x) = \sum_{i=1}^{L} f(i, \tau) \sum_{n=1}^{N} G_i(n) \cdot U(x-n) \quad (19)$$

FIG. 7 shows the preferred embodiment of the interpolation filter according to equation (19). In the polynomial embodiment, the function of $\tau$ is a polynomial in $\tau$, and the matrix $G_i(n)$ are the coefficients of the polynomial. And in the reduced rank matrix embodiment, the function of $\tau$ is to index the above $F_{M \times L}$ matrix B262, and the second summation in equation (19), $$\sum_{n=1}^{N} G_i(n) \cdot U(x-n)$$

is implemented as a bank of FIR filters B260 as shown in FIG. 7. Again, in equation (19) L is the depth of the approximation function $f(i,\tau)$ (e.g., the order of the polynomial or the column size of the above $F_{M \times L}$ matrix) and N is the depth of the interpolation filter's impulse response (i.e., the number of coefficients in the impulse response). It has been determined that N=8 and L=3 provides the best performance/cost balance; however, these values may increase as IC technology progresses and the cost per gate decreases.

*d=0 Remod/Demod Detector*

In sampled amplitude storage systems that employ a d=0 RLL constraint, the read channel is normally equalized to a PR4 response and the discrete time sequence detector implemented as a pair of interleaved sliding threshold Viterbi detectors. PR4 equalization is preferred because higher order d=0 sequence detectors (such as EPR4 and EEPR4) become more complex and expensive to implement due to the increased number of states in the trellis model. It is possible, however, to augment a conventional PR4 sequence detector by searching for minimum distance error events in the EPR4 domain, and then correcting the output of the PR4 detector when an error event is detected. In this manner, the performance of the sequence detector approaches that of an EPR4 detector with lower complexity and cost than d=0 EPR4.

Figure 8A:
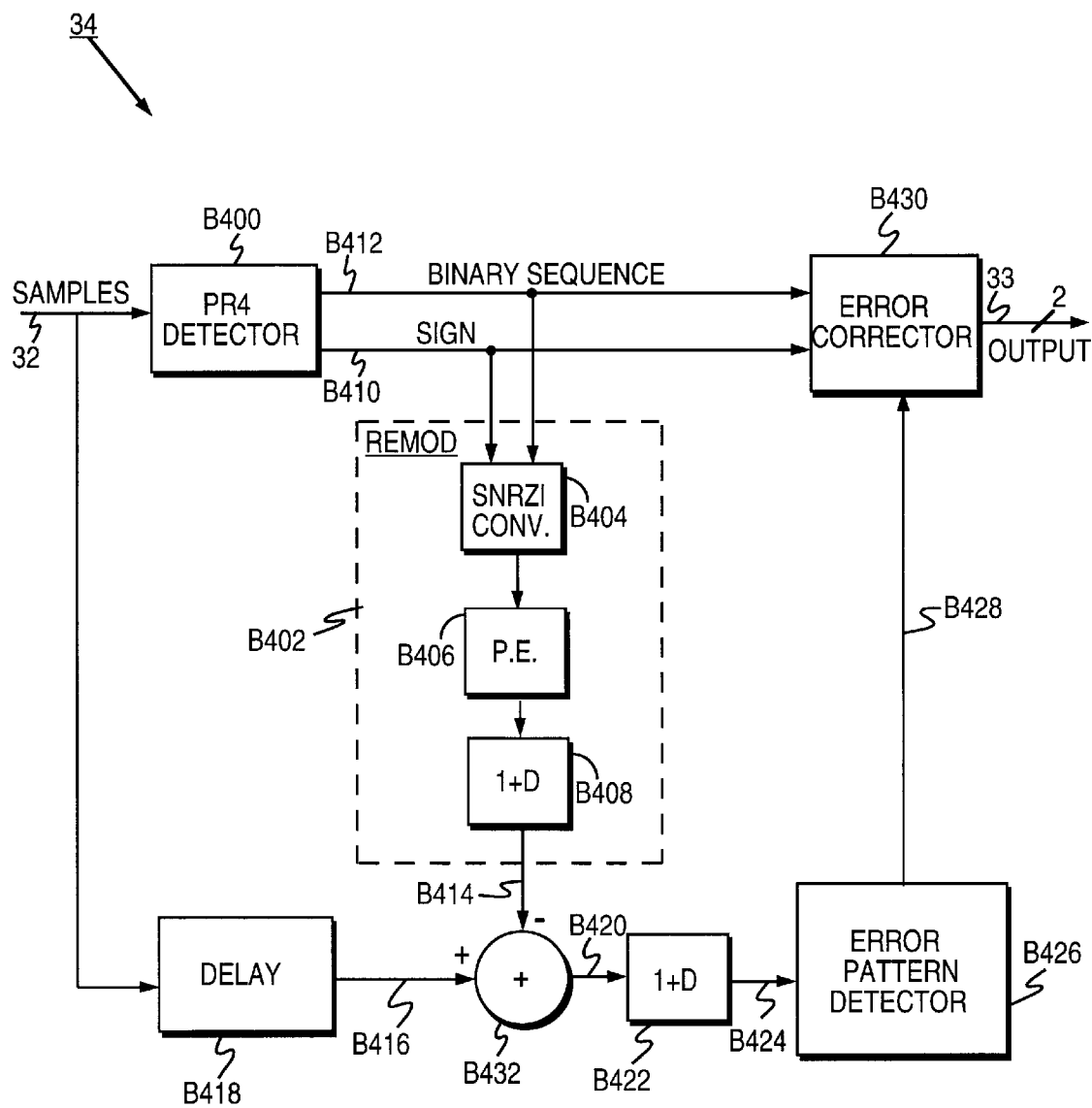
FIG. 8A is an overview of a modified PR4 sequence detector (remod/demod detector) for use in a d=0 read channel of the present invention.

The preferred embodiment of the modified PR4 detector for use in a d=0 read channel is shown in FIG. 8A. It operates according to the following steps:

1. remodulate the output of a conventional PR4 sequence detector into a sequence of ideal PR4 sample values;
2. subtract the ideal PR4 sample values from the read signal sample values to generate a sequence of PR4 sample error values;
3. convert the PR4 sample error values into EPR4 sample error values;
4. filter the EPR4 sample error values with a bank of filters matched to the dominant EPR4 error events; and
5. select the matched filter output with the highest magnitude, and if greater than a predetermined threshold, correct the PR4 detected binary sequence accordingly if the correction is valid (i.e., results in a valid PR4 sequence).

Because the modified PR4 detector of FIG. 8A remodulates the detected binary sequence into an estimated PR4 sample sequence and then demodulates the read signal by correcting errors detected in the EPR4 domain, the detector is referred to as a remod/demod detector.

Referring now to FIG. 8A in detail, a conventional PR4 sequence detector B400 detects a preliminary binary sequence B412 from the read signal sample values 32. The PR4 detector B400 is preferably implemented as a pair of interleaved sliding threshold Viterbi detectors, except that the sign B410 of the transitions in both interleaves is saved and used by a remodulator B402. A sign bit B410 is associated with each "1" and "0" bit output by the PR4 detector B400 in each interleave. For example, if a positive transition is detected in the even interleave, then the PR4 detector B400 outputs a "+1" followed by "+0" values until a negative transition is detected. The sign bit B410, together with the detected binary sequence B412, is used to remodulate to an ideal PR4 sample sequence B414.

The remodulator comprises a signed PR4-to-SNRZI converter B404 (SNRZI is short for signed NRZI), a partial erasure compensator B406, and a 1+D filter B408, the details of which are discussed below. The remodulated sample sequence B414 is subtracted from the actual read signal samples B416 to generate a PR4 sample error sequence B420. (A delay B418 delays the read signal samples to account for the delay of the PR4 sequence detector B400 and remodulator B402.) The PR4 sample error sequence B420 is then passed through a 1+D filter B422 to generate an EPR4 sample error sequence B424.

An error pattern detector B426 matched to the dominant EPR4 error events processes the EPR4 sample error sequence B424, and if an EPR4 error event is detected, a corresponding correction signal B428 is applied to an error corrector circuit B430 which corrects the erroneous bits in the detected binary sequence B412 output by the PR4 sequence detector B400.

Figure 8B:
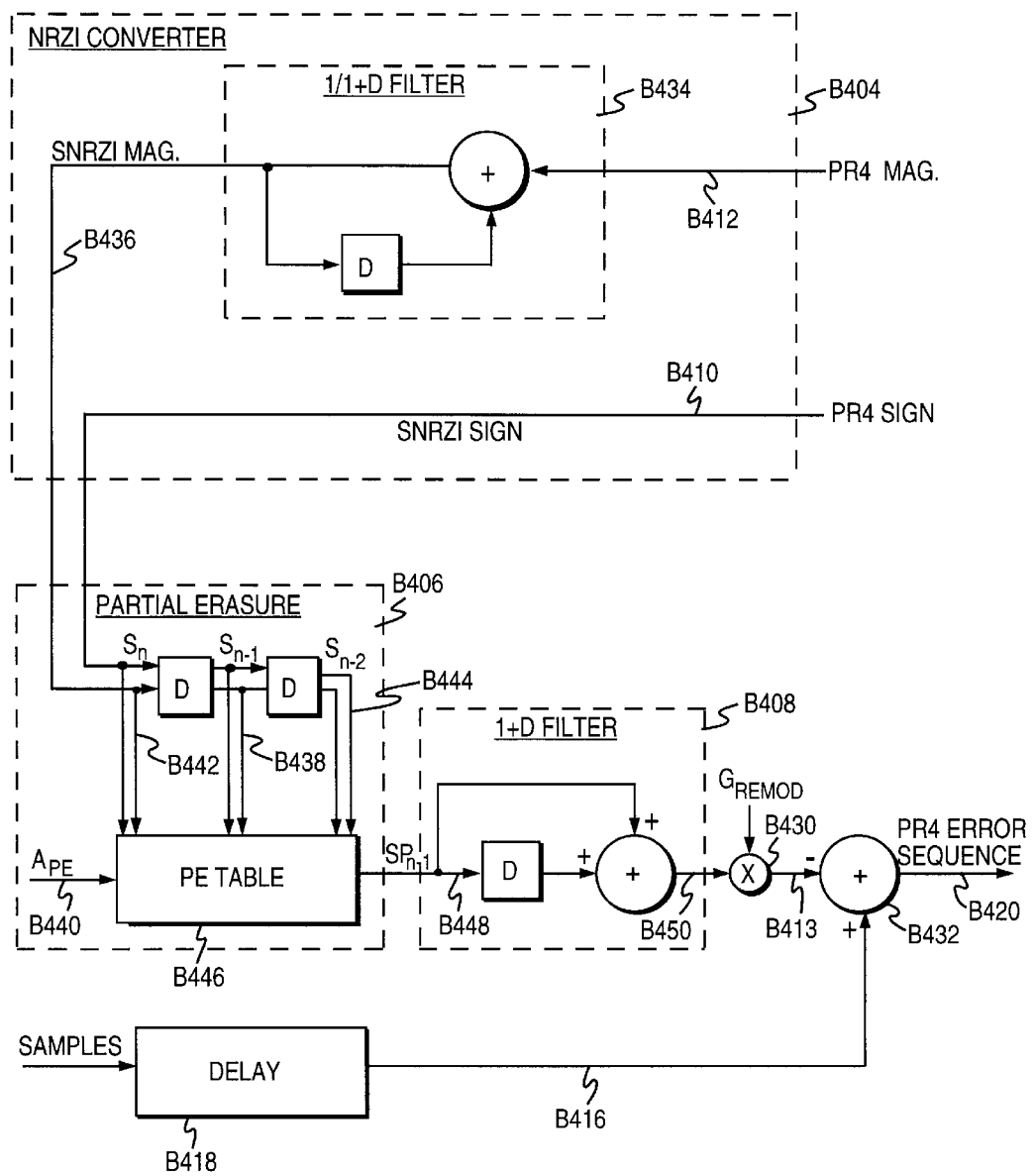
FIG. 8B shows details of the remodulator for the remod/demod sequence detector of FIG. 8A.

Details of the remodulator circuit B402 are shown in FIG. 8B and include a SNRZI converter B404, a partial erasure compensator B406, a 1+D filter B408, a gain B430, and an adder B432. The SNRZI converter B404 receives the detected binary bits B412 (i.e., 0 or 1) and associated sign bits (i.e., ±1 or ±0) B410 from the PR4 sequence detector B400. A 1/1+D filter B434 filters the detected binary sequence B412 to generate a sequence of corresponding SNRZI magnitude samples B436, and the sign bits B410 of the detected binary sequence B412 convert directly to SNRZI sign bits.

Alternatively, the SNRZI converter B404 can be implemented as a lookup table indexed by the detected binary sequence B432 and associated sign bits B410. The lookup table implementation avoids error propagation in the event of a quasi catastrophic error event (i.e., an error which results in unmerged paths in the PR4 sequence detector B400). The entries for the lookup table are shown in Table B3.

After converting the detected binary sequence to a SNRZI sequence (designated $S_n$), a partial erasure compensator B406 adjusts the magnitude of the SNRZI samples to account for the non-linear reduction in pulse amplitude caused by adjacent flux transitions. That is, the magnitude of the SNRZI sample at $S_{n-1}$ B438 is reduced to $\pm A_{PE}$ B440 (where $|\pm A_{PE}|<1$) if there is an adjacent transition either at $S_n$ B442 or at $S_{n-2}$ B444, and the magnitude of $S_{n-1}$ B438 is reduced to $\pm(A_{PE}*A_{PE})$ if there is an adjacent transition both at $S_n$ B442 and at $S_{n-2}$ B444. To implement the partial erasure compensator B406, the SNRZI samples, designated $S_n$, $S_{n-1}$ and $S_{n-2}$, index a lookup table B446 which outputs a modified value for $S_{n-1}$ (designated $SP_{n-1}$ B448) in accordance with the entries shown in Table B4.

After compensating for the effect of partial erasure, the modified SNRZI samples $SP_{n-1}$ B448 pass through a 1+D filter B408, thereby converting the SNRZI samples into an estimated PR4 sample sequence B450. Because the AGC 50 loop attempts to compensate for the non-linear effect of partial erasure by adjusting the read signal amplitude toward an ideal PR4 magnitude on average, a gain multiplier B430 adjusts the magnitude of the remodulated PR4 sequence B450 to compensate for the adjustment made by the AGC 50. The estimated PR4 sample sequence B413 at the output of the gain multiplier B430 is then subtracted from the actual read signal Sample values B416 at adder B432 to generate a PR4 sample error sequence B420.

Figure 8C:
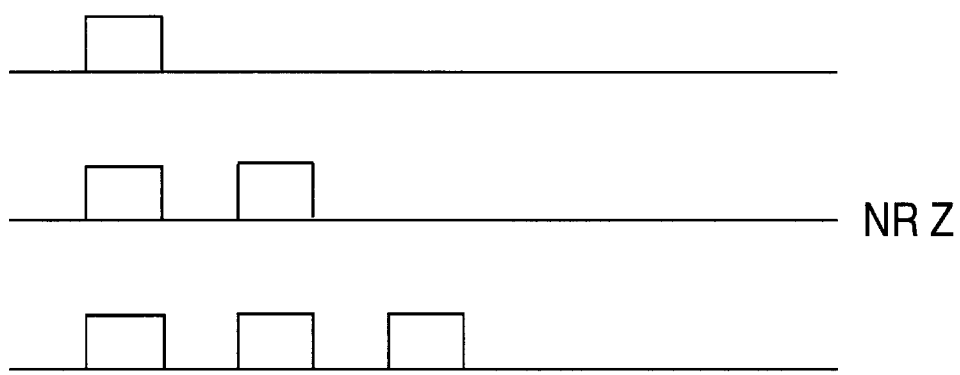
FIG. 8C–8E show three dominant error events in sampled amplitude read channels in the NRZ, PR4 and EPR4 domain.
Figure 8D:
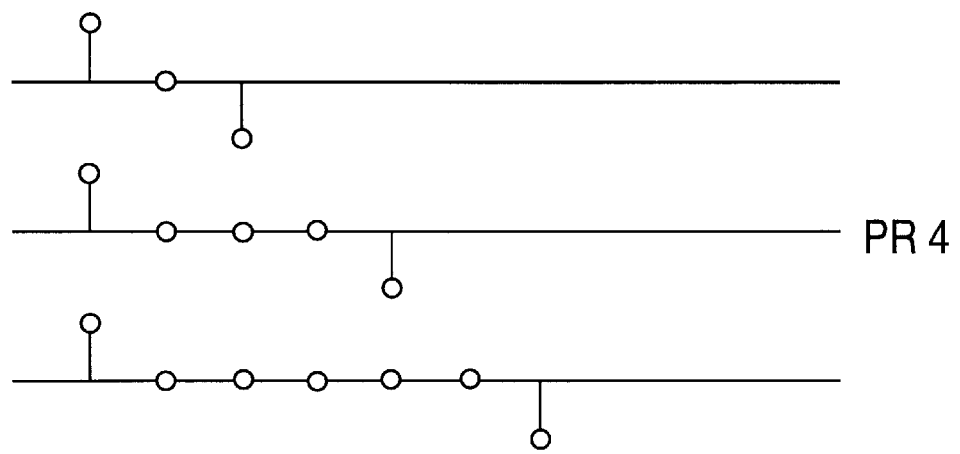
Figure 8E:
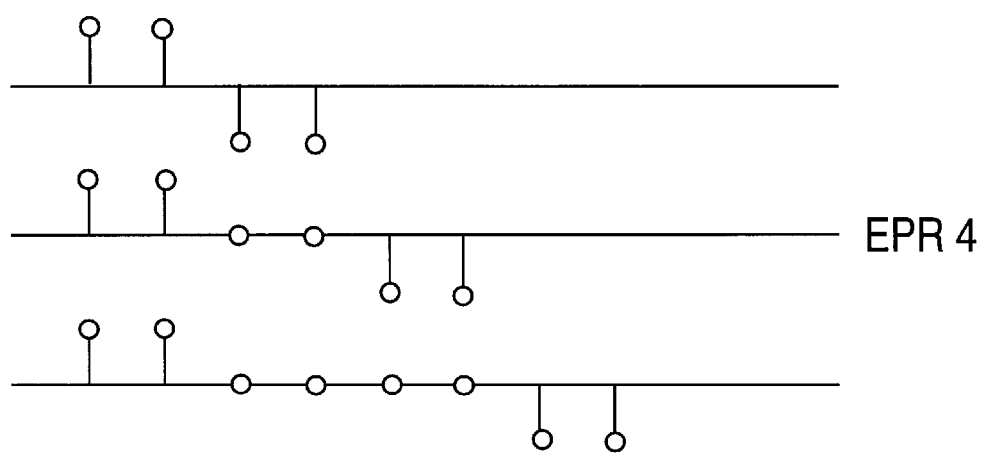

Referring again to FIG. 8A, the PR4 sample error sequence B420 passes through a 1+D filter B422 to generate an EPR4 sample error sequence B424. The EPR4 sample error sequence B424 is then processed by an error pattern detector B426 matched to minimum distance EPR4 error events, examples of which are shown in FIG. 8C–8E. FIG. 8C shows three minimum distance error events for an PR4 detector in the NRZ domain, FIG. 8D shows the same error events in the PR4 domain, and FIG. 8E shows the error events in the EPR4 domain. Notice that the EPR4 error sequences of FIG. 8E can be generated by passing the corresponding PR4 error sequences of FIG. 8D through a 1+D filter. Thus, the error pattern detector B426 can be implemented as a 1+D filter followed by a bank of filters matched to PR4 error sequences. To further simplify the circuit, the 1+D filter B422 of FIG. 8A for converting to an EPR4 sample error sequence can be combined with the 1+D filter in the error pattern detector B426 to form a $1+2D+D^2$ filter B450 as shown in FIG. 8F.

Figure 8F:
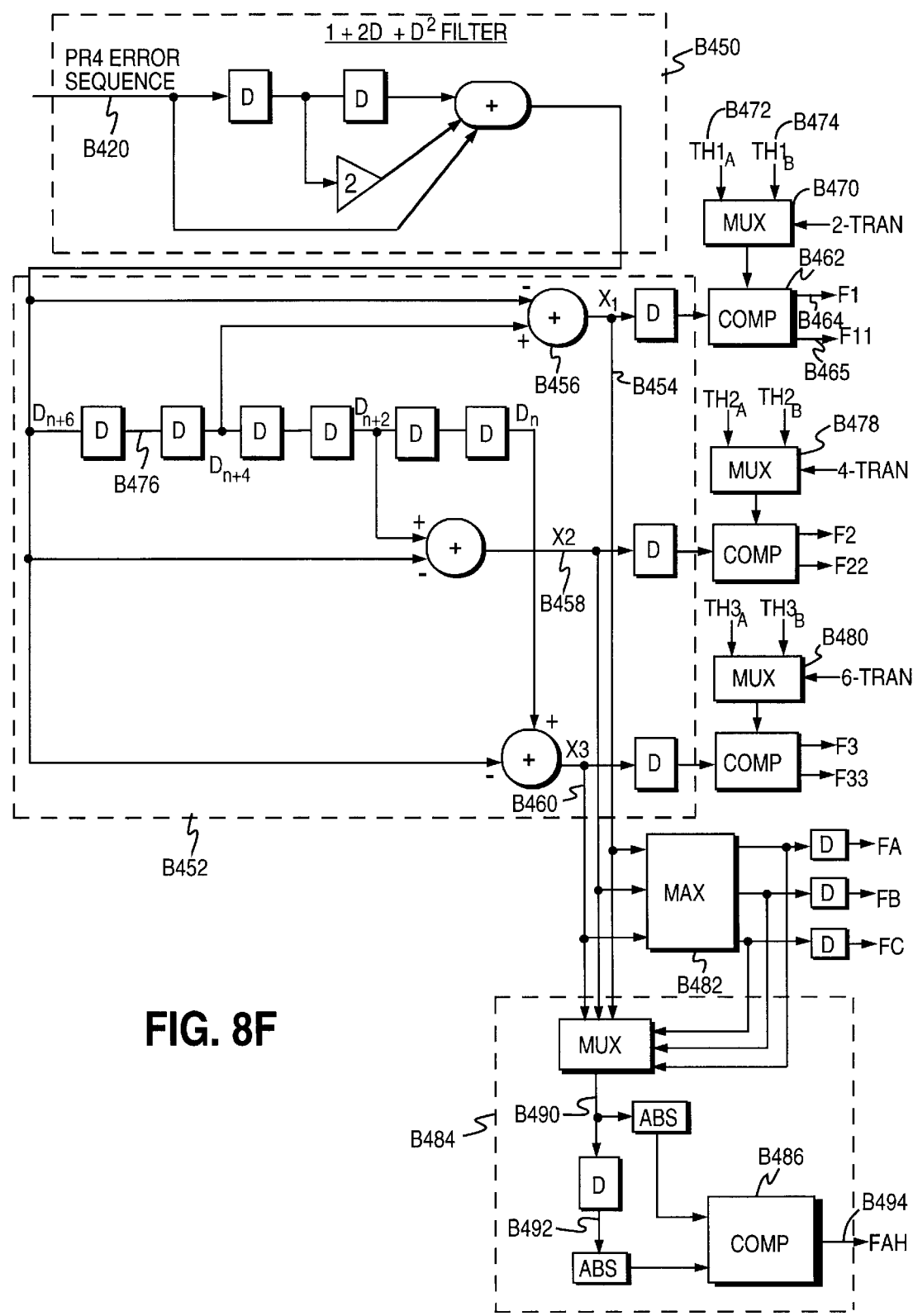
FIG. 8F shows details of an error pattern detector comprising a bank of filters matched to the dominant error events of FIG. 8C–8E.

The output of the $1+2D+D^2$ filter B450 in FIG. 8F is connected to a bank of filters B452 each having an impulse response matched to a corresponding PR4 error sequences shown in FIG. 8D. The output X1 B454 of adder B456 corresponds to the first error sequence in FIG. 8D, the output X2 B458 corresponds to the second error sequence of FIG. 8D, and the output X3 B460 corresponds to the third error sequence in FIG. 8D. The matched filter outputs are compared to a predetermined threshold and an error detect signal is asserted if the threshold is exceeded. For example, a comparator B462 compares the X1 output B454 to a threshold ($TH1_A$ or $TH1_B$) and if X1 B454 exceeds the threshold the F1 signal B464 is asserted. Additionally, the comparator B462 outputs a sign bit F11 B465 indicating the polarity of the detected error (i.e., the polarity of the errors shown in FIG. 8C–8E may be reversed).

If an error event associated with a dibit, quad-bit or 6-bit transition sequence could occur, then the threshold level compared to the output of the corresponding matched filter is reduced to compensate for the effect of partial erasure. (Again, partial erasure is a reduction in pulse amplitude caused by adjacent pulse(s).) For instance, a multiplexer B470 selects the $TH1_A$ threshold B472 to compare to X1 B454 if a dibit sequence is detected, mis-detected, or falsely detected at $D_{n+5}$ B476 (that is, if the NRZI bits at times $D_{n+5}$ and $D_{n+4}$ are both non-zero or both zero); otherwise, the multiplexer B470 selects the $TH1_B$ threshold to compare to X1 B454. Similarly, multiplexer B478 selects a $TH2_A$ threshold to compare to X2 B458 if a quad-bit sequence is detected, mis-detected, or falsely detected at $D_{n+5}$ B476 (that is, if the NRZI bits at times $D_{n+5}$, $D_{n+4}$, $D_{n+3}$ and $D_{n+2}$ are non-zero or zero); otherwise, the multiplexer B478 selects the $TH2_B$ threshold to compare to X2 B458. Finally, multiplexer B480 selects a $TH3_A$ threshold to compare to X3 B460 if a 6-bit transition sequence is detected, mis-detected, or falsely detected at $D_{n+5}$ B476 (that is, if the NRZI bits at times $D_{n+5}$, $D_{n+4}$, $D_{n+3}$, $D_{n+2}$, $D_{n+1}$ and $D_n$ are non-zero or zero); otherwise, the multiplexer B480 selects the $TH3_B$ threshold to compare to X3 B460. The THX A thresholds are computed as the $THX_B$ thresholds multiplied by the partial erasure reduction factor $A_{PE}$ B440 of FIG. 8B. Also, the circuit can be simplified by setting $TH1_A=TH2_A=TH3_A$ and $TH1_B=TH2_B=TH3_B$.

A MAX circuit B482 compares the matched filter outputs X1, X2 and X3 and asserts a signal FA, FB or FC which corresponds to the matched filter output with the highest absolute amplitude. The signals FA, FB and FC are used to correct the detected binary sequence, as described below.

A peak error detector circuit B484, responsive to the matched filter outputs X1, X2 and X3 and the maximum absolute amplitude signals FA, FB and FC, compares B486 the maximum matched filter output at time n B490 to the maximum matched filter output at time n−1 B492. If the maximum filter output at time n is less than at time n−1, then signal FAH B494 is asserted indicating that a peak error signal has been detected. The FAH B494 signal enables operation of the error corrector circuit B430 of FIG. 8A.

In an alternative embodiment not shown, signals FA, FB, FC and FAH of FIG. 8F are generated using the difference between the filter outputs and the comparator thresholds, rather than the output of the filters. That is, the MAX circuit B482 compares three values computed as the difference between the filter outputs $X_k$ and corresponding threshold $TH_k$, and the peak error detector B484 looks for a peak in these difference values. This embodiment may be preferred if different threshold values are used for each error event.

Figure 8G:
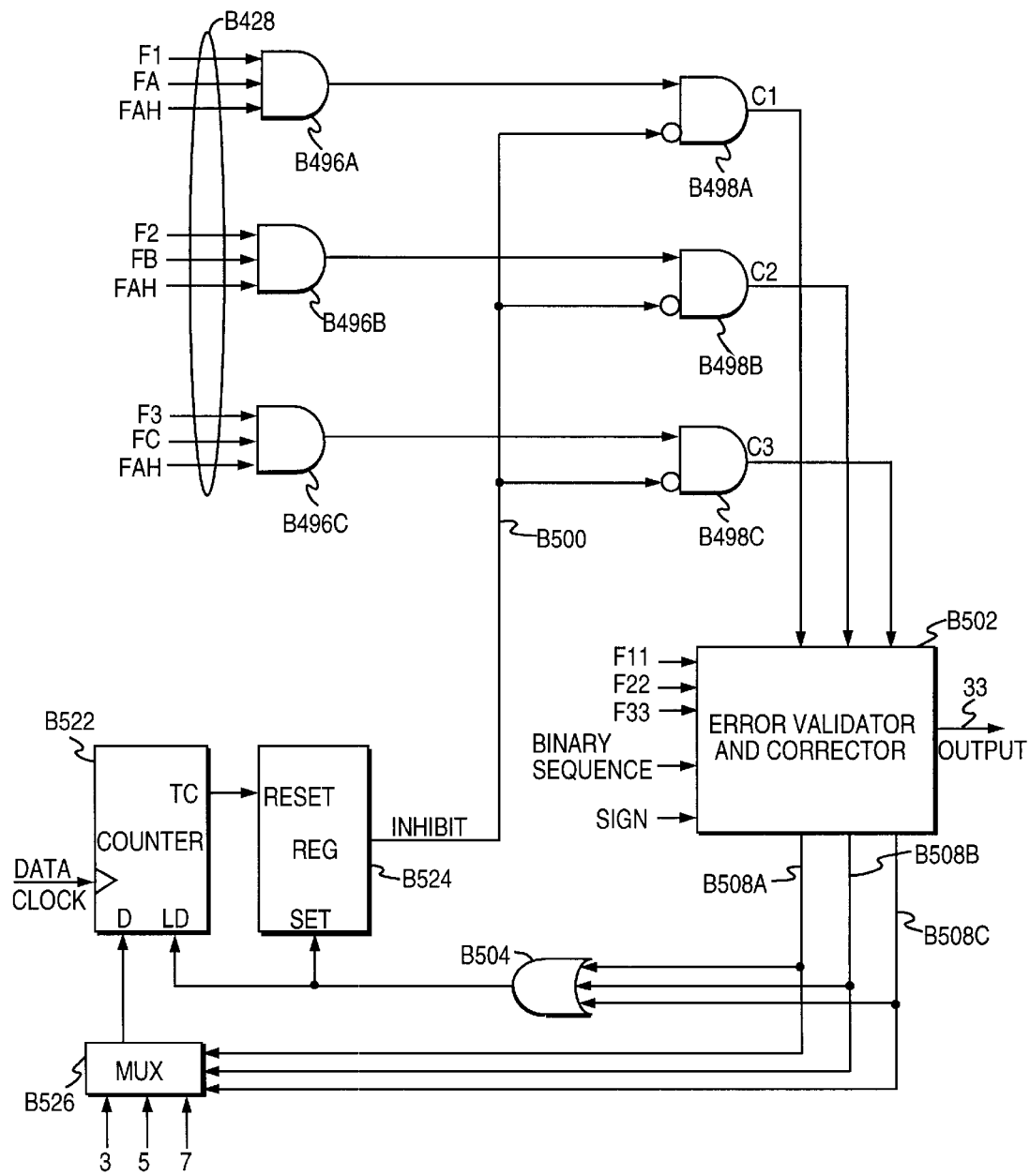
FIG. 8G is a circuit for correcting errors in the detected binary sequence output by the PR4 Viterbi detector when the error pattern detector of FIG. 8F detects an error.
Figure 8H:
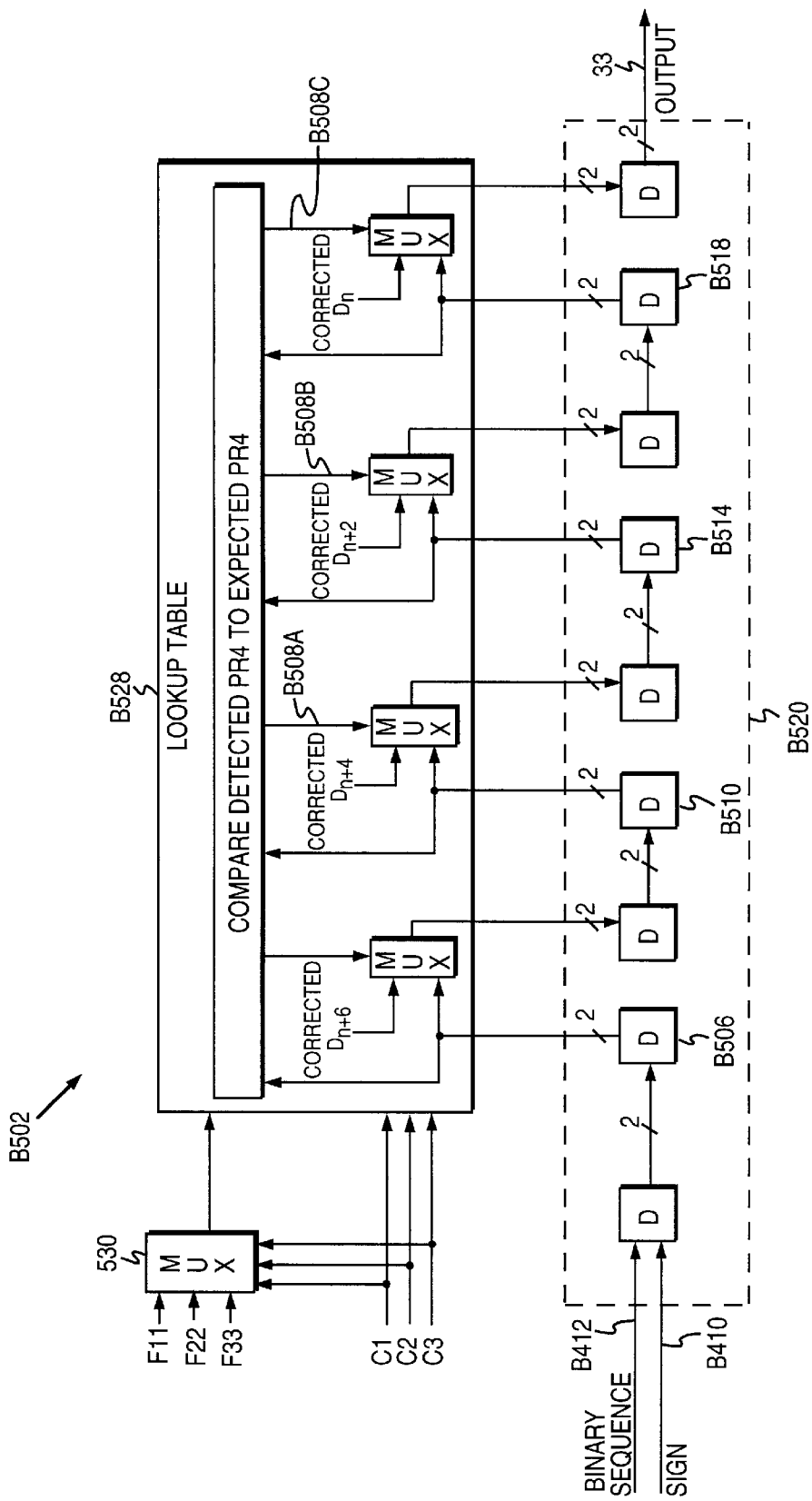
FIG. 8H shows a circuit for checking the validity of a detected error pattern.

Details of the error corrector circuit B430 of FIG. 8A are shown in FIG. 8G and 8H. In FIG. 8G, the F1–F3, FA-FC and FAH signals B428 from the error pattern detector B426 are input into respective error event AND gates B496A–B496C, the outputs of which are enabled through AND gates B498A–B498C by an INHIBIT signal B500. An error event is detected (C1, C2 or C3) if the corresponding matched filter output exceeds the TH threshold (F1, F2, or F3) AND it is the largest error event (FA, FB or FC) AND it is a peak error event (FAH B494 is asserted) AND the INHIBIT signal B500 is not asserted. The detected error events (C1, C2 and C3), error event signs (F11, F22 and F33), detected binary sequence B412 and sign bit B410 are input into an error validator and corrector B502 which corrects the detected binary sequence B412 (and sign bit B410) if the detected error event is valid.

The INHIBIT signal B500 operates as follows: if a valid error event is detected, assert the INHIBIT signal B500 for a number of clock cycles equal to the length of the detected error event; that is, do not process subsequent error events until the current error event has been corrected.

The INHIBIT signal B500 is implemented with a counter B522, a register B524, a multiplexer B526, and an OR gate B504. If a valid error event is detected (B508A, B508B or B508C is asserted), then the output of OR gate B504 sets the output of the register B524 (i.e., the INHIBIT signal B500) high, thereby disabling AND gates B498A–B498C. The detected error event selects a count value, 3, 5, or 7, respectively, through multiplexer B526, and the output of OR gate B504 loads the count value into the counter B522. The DATA CLOCK then clocks the counter B522 and when it reaches terminal count, a TC signal B528 resets the register B524, thereby re-enabling the AND gates B498A–B498C.

The outputs of AND gates B498A–B498C, designated C1, C2 and C3, correspond to the three error events that can be detected by the matched filters in the error pattern detector B426. These signals are used to correct the detected binary sequence B412 (and sign bit B410) as it shifts through a series of registers B520 shown in FIG. 8H. However, before correcting the binary sequence according to a detected error event, the validity of the correction itself is checked.

An error event can be falsely detected if, for example, the noise which causes the detected error has the same polarity as the read signal. To clarify, consider the first error event shown in FIG. 8D. Assuming that this PR4 signal was noise detected erroneously as a dibit data sequence, then the correction would be to add the sequence (−1,−0,+1) to the detected PR4 sequence (+1,+0,−1) in order to cancel the noise. If, however, a dibit data sequence was actually recorded at the same location as the added noise, then an error event of opposite polarity would be detected and the correction would be to add the sequence (+1,+0,−1) to the detected sequence (+1,+0,−1), thereby resulting in a corrected sequence of (+2,+0,−2). In this case, the PR4 sequence detector B400 would make the correct decision, and the detected binary sequence B412 should not be corrected.

Referring again to FIG. 8H, circuitry is provided to check the validity of a detected error event before making a correction to the detected data sequence. A lookup table B528 evaluates the detected error event relative to the detected PR4 sequence. A correction is made to the detected binary sequence B412 (and sign bit B410) output by the PR4 sequence detector B400 only if the correction results in a valid PR4 sequence. That is, for each error event, the detected PR4 sequence must match a possible expected PR4 sequence or a correction is not made.

In operation, the lookup table B528 receives the detected error event (C1, C2, or C3), the sign of the error event (F11, F22, or F33as selected by the detected error event via multiplexer B530), and the corresponding detected PR4 data (detected binary sequence B412 and sign bit B410) at $D_{n+6}$ B506, $D_{n+4}$ B510, $D_{n+2}$ B514 and $D_n$ B518. If a C1 error event is detected, then using Table B5 below the lookup table B528 compares the detected PR4 sequence to the expected PR4 sequence at $D_{n+6}$ B506 and $D_{n+4}$ B510. If there is a match, then the corrected PR4 data at $D_{n+6}$ and $D_{n+4}$ is inserted into the shift register B520; otherwise, the detected PR4 sequence is restored to the shift register B520 uncorrected. Similarly, if a C2 error event is detected, then using Table B6 below the lookup table B528 compares the detected PR4 sequence to the expected PR4 sequence at $D_{n+6}$ B506, $D_{n+4}$ B510 and $D_{n+2}$ B514. If there is a match, then the corrected PR4 data at $D_{n+6}$, $D_{n+4}$ and $D_{n+2}$ is inserted into the shift register B520; otherwise, the detected PR4 sequence is restored to the shift register B520 uncorrected. Finally, if a C3 error event is detected, then using Table B7 below the lookup table B528 compares the detected PR4 sequence to the expected PR4 sequence at $D_{n+6}$ B506, $D_{n+4}$ B510, $D_{n+2}$ B514 and $D_n$ B518. If there is a match, then the correct PR4 data at $D_{n+6}$, $D_{n+4}$, $D_{n+2}$ and $D_n$ is inserted into the shift register B520; otherwise, the detected PR4 sequence is restored to the shift register B520 uncorrected. The corrected binary sequence B412 (and sign bit B410) is then shifted out of the shift register B520 for further processing by the read channel.

The objects of the invention have been fully realized through the embodiments disclosed herein. Those skilled in the art will appreciate that the various aspects of the invention can be achieved through different embodiments without departing from the essential function. The particular embodiments disclosed are illustrative and not meant to limit the scope of the invention as appropriately construed from the following claims.

TABLE 1

| Channel | Transfer Function | Dipulse Response |
|---------|-------------------|------------------|
| PR4     | $(1 - D)(1 + D)$  | 0, 1, 0, −1, 0, 0, 0, ... |
| EPR4    | $(1 - D)(1 + D)^2$ | 0, 1, 1, −1, −1, 0, 0, ... |
| EEPR4   | $(1 - D)(1 + D)^3$ | 0, 1, 2, 0, −2, −1, 0, ... |

TABLE B2

| τ · 32/Ts | C(−2) | C(−2) | C(0) | C(1) | C(2) | C(3) |
|---|---|---|---|---|---|---|
| 0  | 0.0000 | −0.0000 | 1.0000 | 0.0000 | −0.0000 | 0.0000 |
| 1  | 0.0090 | −0.0231 | 0.9965 | 0.0337 | −0.0120 | 0.0068 |
| 2  | 0.0176 | −0.0445 | 0.9901 | 0.0690 | −0.0241 | 0.0135 |
| 3  | 0.0258 | −0.0641 | 0.9808 | 0.1058 | −0.0364 | 0.0202 |
| 4  | 0.0335 | −0.0819 | 0.9686 | 0.1438 | −0.0487 | 0.0268 |
| 5  | 0.0407 | −0.0979 | 0.9536 | 0.1829 | −0.0608 | 0.0331 |
| 6  | 0.0473 | −0.1120 | 0.9359 | 0.2230 | −0.0728 | 0.0393 |
| 7  | 0.0533 | −0.1243 | 0.9155 | 0.2638 | −0.0844 | 0.0451 |
| 8  | 0.0587 | −0.1348 | 0.8926 | 0.3052 | −0.0957 | 0.0506 |
| 9  | 0.0634 | −0.1434 | 0.8674 | 0.3471 | −0.1063 | 0.0556 |
| 10 | 0.0674 | −0.1503 | 0.8398 | 0.3891 | −0.1164 | 0.0603 |
| 11 | 0.0707 | −0.1555 | 0.8101 | 0.4311 | −0.1257 | 0.0644 |
| 12 | 0.0732 | −0.1589 | 0.7784 | 0.4730 | −0.1341 | 0.0680 |
| 13 | 0.0751 | −0.1608 | 0.7448 | 0.5145 | −0.1415 | 0.0710 |
| 14 | 0.0761 | −0.1611 | 0.7096 | 0.5554 | −0.1480 | 0.0734 |
| 15 | 0.0765 | −0.1598 | 0.6728 | 0.5956 | −0.1532 | 0.0751 |
| 16 | 0.0761 | −0.1572 | 0.6348 | 0.6348 | −0.1572 | 0.0761 |
| 17 | 0.0751 | −0.1532 | 0.5956 | 0.6728 | −0.1598 | 0.0765 |
| 18 | 0.0734 | −0.1480 | 0.5554 | 0.7096 | −0.1611 | 0.0761 |
| 19 | 0.0710 | −0.1415 | 0.5145 | 0.7448 | −0.1608 | 0.0751 |
| 20 | 0.0680 | −0.1341 | 0.4730 | 0.7784 | −0.1589 | 0.0732 |
| 21 | 0.0644 | −0.1257 | 0.4311 | 0.8101 | −0.1555 | 0.0707 |
| 22 | 0.0603 | −0.1164 | 0.3891 | 0.8398 | −0.1503 | 0.0674 |
| 23 | 0.0556 | −0.1063 | 0.3471 | 0.8674 | −0.1434 | 0.0634 |
| 24 | 0.0506 | −0.0957 | 0.3052 | 0.8926 | −0.1348 | 0.0587 |
| 25 | 0.0451 | −0.0844 | 0.2638 | 0.9155 | −0.1243 | 0.0533 |
| 26 | 0.0393 | −0.0728 | 0.2230 | 0.9359 | −0.1120 | 0.0473 |
| 27 | 0.0331 | −0.0608 | 0.1829 | 0.9536 | −0.0979 | 0.0407 |
| 28 | 0.0268 | −0.0487 | 0.1438 | 0.9686 | −0.0819 | 0.0335 |
| 29 | 0.0202 | −0.0364 | 0.1058 | 0.9808 | −0.0641 | 0.0258 |
| 30 | 0.0135 | −0.0241 | 0.0690 | 0.9901 | −0.0445 | 0.0176 |
| 31 | 0.0068 | −0.0120 | 0.0337 | 0.9965 | −0.0231 | 0.0090 |

TABLE B3

| PR4 Output | | SNRZI | | PR4 Output | | SNRZI | |
|---|---|---|---|---|---|---|---|
| $D_{n-1}$ | $D_n$ | $S_{n-1}$ | $S_n$ | $D_{n-1}$ | $D_n$ | $S_{n-1}$ | $S_n$ |
| +0 | +0 | +0 | +0 | +1 | +0 | +0 | +0 |
| +0 | −0 | +1 | −1 | +1 | +1 | +1 | +0 |
| −0 | −0 | −0 | −0 | +1 | −1 | +0 | −1 |
| −0 | +0 | −1 | +1 | −1 | −0 | −0 | −0 |
| +0 | −1 | +0 | −1 | −1 | +1 | −0 | +1 |
| −0 | +1 | −0 | +1 | −1 | −1 | −1 | −0 |
| +0 | +1 | +1 | +0 | +1 | −0 | +1 | −1 |
| −0 | −1 | −1 | −0 | −1 | +0 | −1 | +1 |

TABLE B4

| SNRZI | | | MODIFIED SNRZI | SNRZI | | | MODIFIED SNRZI |
|---|---|---|---|---|---|---|---|
| $S_{n-2}$ | $S_{n-1}$ | $S_n$ | $SP_{n-1}$ | $S_{n-2}$ | $S_{n-1}$ | $S_n$ | $SP_{n-1}$ |
| 0  | +1 | 0  | +1 | 0  | −1 | 0  | −1 |
| −1 | +1 | 0  | $+A_{PE}$ | +1 | −1 | 0  | $-A_{PE}$ |
| 0  | +1 | −1 | $+A_{PE}$ | 0  | −1 | +1 | $-A_{PE}$ |
| −1 | +1 | −1 | $+(A_{PE}*/A_{PE})$ | +1 | −1 | +1 | $-(A_{PE}*/A_{PE})$ |

TABLE B5

(C1 Error Event)

| F11 | Expected PR4 | | Corrected PR4 | | F11 | Expected PR4 | | Corrected PR4 | |
|---|---|---|---|---|---|---|---|---|---|
|  | $D_{n+6}$ | $D_{n+4}$ | $D_{n+6}$ | $D_{n+4}$ |  | $D_{n+6}$ | $D_{n+4}$ | $D_{n+6}$ | $D_{n+4}$ |
| 0 | +1 | −1 | +0 | +0 | 1 | −1 | +1 | −0 | −0 |
| 0 | −0 | −1 | −1 | +0 | 1 | +0 | +1 | +1 | −0 |
| 0 | +1 | −0 | +0 | +1 | 1 | −1 | +0 | −0 | −1 |
| 0 | −0 | −0 | −1 | +1 | 1 | +0 | +0 | +1 | −1 |

TABLE B6

(C2 Error Event)

| F22 | Expected PR4 | | | Corrected PR4 | | | F22 | Expected PR4 | | | Corrected PR4 | | |
|---|---|---|---|---|---|---|---|---|---|---|---|---|---|
|  | $D_{n+6}$ | $D_{n+4}$ | $D_{n+2}$ | $D_{n+6}$ | $D_{n+4}$ | $D_{n+2}$ |  | $D_{n+6}$ | $D_{n+4}$ | $D_{n+2}$ | $D_{n+6}$ | $D_{n+4}$ | $D_{n+2}$ |
| 0 | +1 | −0 | −1 | +0 | +0 | +0 | 1 | −1 | +0 | +1 | −0 | −0 | −0 |
| 0 | −0 | −0 | −1 | −1 | +0 | +0 | 1 | +0 | +0 | +1 | +1 | −0 | −0 |
| 0 | +1 | −0 | −0 | +0 | +0 | +1 | 1 | −1 | +0 | +0 | −0 | −0 | −1 |
| 0 | −0 | −0 | −0 | −1 | +0 | +1 | 1 | +0 | +0 | +0 | +1 | −0 | −1 |

TABLE B7

(C3 Error Event)

| F33 | Expected PR4 | | | | Corrected PR4 | | | | F33 | Expected PR4 | | | | Corrected PR4 | | | |
|---|---|---|---|---|---|---|---|---|---|---|---|---|---|---|---|---|---|
| | $D_{n+6}$ | $D_{n+4}$ | $D_{n+2}$ | $D_n$ | $D_{n+6}$ | $D_{n+4}$ | $D_{n+2}$ | $D_n$ | | $D_{n+6}$ | $D_{n+4}$ | $D_{n+2}$ | $D_n$ | $D_{n+6}$ | $D_{n+4}$ | $D_{n+2}$ | $D_n$ |
| 0 | +1 | −0 | −0 | −1 | +0 | +0 | +0 | +0 | 1 | −1 | +0 | +0 | −1 | −0 | −0 | −0 | −0 |
| 0 | −0 | −0 | −0 | −1 | −1 | +0 | +0 | +0 | 1 | +0 | +0 | +0 | +1 | +1 | −0 | −0 | −0 |
| 0 | +1 | −0 | −0 | −0 | +0 | +0 | +0 | +1 | 1 | −1 | +0 | +0 | +0 | −0 | −0 | −0 | −1 |
| 0 | −0 | −0 | −0 | −0 | −1 | +0 | +0 | +1 | 1 | +0 | +0 | +0 | +0 | +1 | −0 | −0 | −1 |

We claim:

1. A sampled amplitude read channel for reading binary data from a sequence of discrete time sample values generated by sampling pulses in an analog read signal from a read head positioned over a disk storage medium, comprising:
   (a) a sampling device for sampling the analog read signal to generate a sequence of asynchronous sample values;
   (b) an interpolator for interpolating the asynchronous sample values to generate synchronous sample values; and
   (c) a discrete time detector for detecting the binary data from the synchronous sample values, comprising:
      (a) a demodulator, responsive to the synchronous sample values, for detecting a binary sequence having one or more bit errors;
      (b) a remodulator for converting the binary sequence into a sequence of estimated sample values;
      (c) an adder, responsive to the synchronous sample values and the estimated sample values, for generating a sequence of sample error values;
      (d) an error pattern detector, responsive to the sequence of sample error values, for detecting a magnitude and location of the bit errors in the binary sequence; and
      (e) an error corrector, responsive to the magnitude and location of the bit errors, for correcting the binary sequence.

2. The sampled amplitude read channel as recited in claim 1, wherein the demodulator outputs a sign and magnitude of the binary sequence.

3. The sampled amplitude read channel as recited in claim 1, wherein the remodulator comprises a NRZI converter for converting the binary sequence into a NRZI sequence.

4. The sampled amplitude read channel as recited in claim 1, wherein the remodulator comprises a partial erasure compensator which compensates for the non-linear reduction in amplitude of a primary pulse caused by secondary pulses located near the primary pulse.

5. The sampled amplitude read channel as recited in claim 1, wherein the error pattern detector comprises a plurality of discrete time filters matched to a predetermined error event.

6. The sampled amplitude read channel as recited in claim 1, further comprising a means for converting the sequence of sample error values from a lower order partial response domain to a higher order partial response domain, wherein the error pattern detector detects the bit errors in the higher order partial response domain.

7. The sampled amplitude read channel as recited in claim 1, wherein the demodulator comprises a PR4 sequence detector.

8. The sampled amplitude read channel as recited in claim 1, further comprising an error detection validator for checking the validity of a detected error event and enabling the error corrector if the detected error event is valid.

9. The sampled amplitude read channel as recited in claim 1, wherein the interpolator comprises:

(a) a frequency offset generator for generating a frequency offset $\Delta f$ proportional to a frequency difference between a sampling clock and the baud rate; and
   (b) a mod-Ts accumulator for accumulating, modulo-Ts, the frequency offset $\Delta f$ to generate an interpolation interval $\tau$ where Ts is a predetermined sample period of the sampling clock.

10. The sampled amplitude read channel as recited in claim 9, wherein the frequency offset generator comprises:
   (a) a phase error detector for detecting a phase error $\Delta\theta$ between an interpolated sample value and an estimated sample value; and
   (b) a loop filter for filtering the phase error $\Delta\theta$ to generate the frequency offset $\Delta f$.

11. The sampled amplitude read channel as recited in claim 1, wherein the interpolator is responsive to an interpolation interval $\tau$ proportional to a time difference between a channel sample value and a desired interpolated sample value.

12. The sampled amplitude read channel as recited in claim 11, wherein the interpolator comprises an actual interpolation filter having an actual impulse response h(k) which approximates an ideal impulse response of an ideal interpolation filter:

$$\mathrm{sinc}(\pi \cdot (k-\tau/Ts));$$

where:
   k is a time index; and
   Ts is a sample period of the sampling clock.

13. The sampled amplitude read channel as recited in claim 11, wherein the interpolator comprises an actual interpolation filter having an actual impulse response h(k) generated by minimizing a mean squared error between a frequency response of the actual interpolation filter and an ideal frequency response corresponding to an ideal interpolation filter.

14. The sampled amplitude read channel as recited in claim 11, wherein:
   (a) the interpolator comprises an actual interpolation filter; and
   (b) a plurality of coefficients $C_{\tau,k}$ of the actual interpolation filter are computed in real time as a function of $\tau$.

15. The sampled amplitude read channel as recited in claim 1, wherein the interpolator further generates a data clock for clocking the discrete time detector.

16. A sampled amplitude read channel for reading binary data from a sequence of discrete time sample values generated by sampling pulses in an analog read signal from a read head positioned over a disk storage medium, comprising:
   (a) a sampling device for sampling the analog read signal to generate the sequence of discrete time sample values;

(b) timing recovery for synchronizing the discrete time sample values to generate synchronous sample values; and (c) a discrete time detector for detecting the binary data from the synchronous sample values, comprising:
  (a) a demodulator, responsive to the synchronous sample values, for detecting a binary sequence having one or more bit errors;
  (b) a remodulator for converting the binary sequence into a sequence of estimated sample values, comprising a partial erasure compensator which compensates for the non-linear reduction in amplitude of a primary pulse caused by secondary pulses located near the primary pulse;
  (c) an adder, responsive to the synchronous sample values and the estimated sample values, for generating a sequence of sample error values;
  (d) an error pattern detector, responsive to the sequence of sample error values, for detecting a magnitude and location of the bit errors in the binary sequence; and
  (e) an error corrector, responsive to the magnitude and location of the bit errors, for correcting the binary sequence.

17. The sampled amplitude read channel as recited in claim 16, wherein the demodulator outputs a sign and magnitude of the binary sequence.

18. The sampled amplitude read channel as recited in claim 16, wherein the remodulator comprises a NRZI converter for converting the binary sequence into a NRZI sequence.

19. The sampled amplitude read channel as recited in claim 16, wherein the error pattern detector comprises a plurality of discrete time filters each matched to a predetermined error event.

20. The sampled amplitude read channel as recited in claim 16, further comprising an error detection validator for checking the validity of a detected error event and enabling the error corrector if the detected error event is valid.

21. A sampled amplitude read channel for reading binary data from a sequence of discrete time sample values generated by sampling pulses in an analog read signal from a read head positioned over a disk storage medium, comprising:
  (a) a sampling device for sampling the analog read signal to generate the sequence of discrete time sample values;
  (b) timing recovery for synchronizing the discrete time sample values to generate synchronous sample values; and
  (c) a discrete time detector for detecting the binary data from the synchronous sample values, comprising:
    (a) a demodulator, responsive to the synchronous sample values, for detecting a binary sequence having one or more bit-errors;
    (b) a remodulator for converting the binary sequence into a sequence of estimated sample values;
    (c) an adder, responsive to the synchronous sample values and the estimated sample values, for generating a sequence of sample error values;
    (d) a multiplier for correcting a gain error in the sample error values;
    (e) an error pattern detector, responsive to the sequence of sample error values, for detecting a magnitude and location of the bit errors in the binary sequence; and
    (f) an error corrector, responsive to the magnitude and location of the bit errors, for correcting the binary sequence.

22. A sampled amplitude read channel for reading binary data from a sequence of discrete time sample values generated by sampling pulses in an analog read signal from a read head positioned over a disk storage medium, comprising:
  (a) a sampling device for sampling the analog read signal to generate the sequence of discrete time sample values;
  (b) timing recovery for synchronizing the discrete time sample values to generate synchronous sample values; and
  (c) a discrete time detector for detecting the binary data from the synchronous sample values, comprising:
    (a) a demodulator, responsive to the synchronous sample values, for detecting a binary sequence having one or more bit errors;
    (b) a remodulator for converting the binary sequence into a sequence of estimated sample values;
    (c) an adder, responsive to the synchronous sample values and the estimated sample values, for generating a sequence of sample error values;
    (d) an error pattern detector, responsive to the sample error values, for detecting a magnitude and location of the bit errors in the binary sequence, comprising:
      a plurality of discrete time filters each matched to a predetermined error event; and
      a peak detector, responsive to the discrete time filters, for detecting a peak error event; and
    (e) an error corrector, responsive to the magnitude and location of the bit errors, for correcting the binary sequence.

23. The sampled amplitude read channel as recited in claim 22, wherein the peak detector detects a peak in a difference value computed as a difference between an output of the discrete time filters and a threshold.

24. A sampled amplitude read channel for reading binary data from a sequence of discrete time sample values generated by sampling pulses in an analog read signal from a read head positioned over a disk storage medium, comprising:
  (a) a sampling device for sampling the analog read signal to generate the sequence of discrete time sample values;
  (b) timing recovery for synchronizing the discrete time sample values to generate synchronous sample values; and
  (c) a discrete time detector for detecting the binary data from the synchronous sample values, comprising:
    (a) a demodulator, responsive to the synchronous sample values, for detecting a binary sequence having one or more bit errors;
    (b) a remodulator for converting the binary sequence into a sequence of estimated sample values;
    (c) an adder, responsive to the synchronous sample values and the estimated sample values, for generating a sequence of sample error values;
    (d) an error pattern detector, responsive to the sample error values, for detecting a magnitude and location of the bit errors in the binary sequence, wherein:
      the bit errors occur in a predetermined pattern;
      if the error pattern detector detects an error pattern in the sample error values, the error pattern detector is disabled for a predetermined number of clock periods; and
    (e) an error corrector, responsive to the magnitude and location of the bit errors, for correcting the binary sequence.

25. The sampled amplitude read channel as recited in claim 24, wherein if the error pattern detector detects an error pattern in the sample error values, the error pattern detector is disabled for the duration of the detected error pattern.

26. A sampled amplitude read channel for reading binary data from a sequence of discrete time sample values generated by sampling pulses in an analog read signal from a read head positioned over a disk storage medium, comprising:

(a) a sampling device for sampling the analog read signal to generate the sequence of discrete time sample values;

(b) timing recovery for synchronizing the discrete time sample values to generate synchronous sample values; and (c) a discrete time detector for detecting the binary data from the synchronous sample values, comprising:

(a) a demodulator, responsive to the synchronous sample values, for detecting a binary sequence having one or more bit errors;

(b) a remodulator for converting the binary sequence into a sequence of estimated sample values;

(c) an adder, responsive to the synchronous sample values and the estimated sample values, for generating a sequence of sample error values;

(d) an error pattern detector, responsive to the sequence of sample error values, for detecting a magnitude and location of the bit errors in the binary sequence;

(e) an error detection validator for checking the validity of a detected error event; and (f), an error corrector, responsive to the magnitude and location of the bit errors and the error detection validator, for correcting the binary sequence.

27. The sampled amplitude read channel as recited in claim 26, wherein the error detection validator is responsive to the sign of the error event and detected data associated with the presence and absence of a pulse.

28. The sampled amplitude read channel as recited in claim 27, wherein the detected data associated with the presence and absence of a pulse is signed PR4 data.

\* \* \* \* \*